(12) United States Patent
Uenaka

(10) Patent No.: US 7,856,175 B2
(45) Date of Patent: Dec. 21, 2010

(54) ANTI-SHAKE APPARATUS

(75) Inventor: Yukio Uenaka, Tokyo (JP)

(73) Assignee: HOYA Corporation, Tokyo (JP)

( * ) Notice: Subject to any disclaimer, the term of this patent is extended or adjusted under 35 U.S.C. 154(b) by 722 days.

(21) Appl. No.: 11/775,898

(22) Filed: Jul. 11, 2007

(65) Prior Publication Data

US 2008/0013934 A1    Jan. 17, 2008

(30) Foreign Application Priority Data

Jul. 13, 2006 (JP) .............................. 2006-192616
Jul. 13, 2006 (JP) .............................. 2006-192719

(51) Int. Cl.
*G03B 17/00* (2006.01)
(52) U.S. Cl. ....................................................... 396/55
(58) Field of Classification Search ................... 396/55; 348/208.7, 208.8, 208.11
See application file for complete search history.

(56) References Cited

U.S. PATENT DOCUMENTS

| | | | |
|---|---|---|---|
| 5,655,157 A * | 8/1997 | Enomoto | 396/55 |
| 6,263,162 B1 | 7/2001 | Yamazaki et al. | |
| 6,389,228 B1 | 5/2002 | Uenaka | |
| 6,408,135 B1 | 6/2002 | Imada | |
| 6,456,789 B1 | 9/2002 | Uenaka | |
| 6,654,554 B2 | 11/2003 | Uenaka | |
| 7,590,336 B2 * | 9/2009 | Higo | 396/55 |
| 2003/0231393 A1 * | 12/2003 | Yamamoto et al. | 359/557 |

FOREIGN PATENT DOCUMENTS

| | | |
|---|---|---|
| JP | 7 261234 | 10/1995 |
| JP | 8 262522 | 10/1996 |
| JP | 9 51465 | 2/1997 |
| JP | 2897413 | 3/1999 |
| JP | 11 218794 | 8/1999 |
| JP | 2000 122106 | 4/2000 |
| JP | 2000 321612 | 11/2000 |
| JP | 2001 159767 | 6/2001 |
| JP | 2001 223932 | 8/2001 |
| JP | 2001 305597 | 10/2001 |
| JP | 2003 43544 | 2/2003 |
| JP | 2005 292799 | 10/2005 |
| JP | 2006 39183 | 2/2006 |
| JP | 2006 84540 | 3/2006 |

OTHER PUBLICATIONS

English language Abstract of JP 7-261234.
English language Abstract of JP 11-218794.
U.S. Appl. No. 11/775,889 to Uenaka, filed Jul. 11, 2007.
U.S. Appl. No. 11/775,887 to Uenaka, filed Jul. 11, 2007.
U.S. Appl. No. 11/775,886 to Uenaka, filed Jul. 11, 2007.
U.S. Appl. No. 11/775,891 to Uenaka, filed Jul. 11, 2007.

(Continued)

*Primary Examiner*—W. B. Perkey
(74) *Attorney, Agent, or Firm*—Greenblum & Bernstein, P.L.C.

(57) ABSTRACT

An anti-shake apparatus of a photographing apparatus comprises a movable unit and a controller. The controller performs movement control of the movable unit for anti-shake operation. The movement control is set to the OFF state when the movable unit comes into contact with an end of its range of movement under a predetermined condition.

12 Claims, 10 Drawing Sheets

OTHER PUBLICATIONS

U.S. Appl. No. 11/775,900 to Uenaka, filed Jul. 11, 2007.
U.S. Appl. No. 11/775,904 to Uenaka, filed Jul. 11, 2007.
U.S. Appl. No. 11/775,912 to Uenaka, filed Jul. 11, 2007.
U.S. Appl. No. 11/775,922 to Uenaka, filed Jul. 11, 2007.
English language Abstract of JP 2000-321612.
English language Abstract of JP 2001-305597.
English language Abstract of JP 2003-43544.
English language Abstract of JP 9-51465.
English language Abstract of JP 2000-122106.
English language Abstract of JP 2001-223932.
English language Abstract of JP 2006-39183.
English language Abstract of JP 2006-84540.
English language Abstract of JP 8-262522.
English language Abstract of JP 2001-159767.
English language Abstract of JP 2005-292799.

* cited by examiner

ANTI-SHAKE APPARATUS

BACKGROUND OF THE INVENTION

1. Field of the Invention

The present invention relates to an anti-shake apparatus for a photographing apparatus, and in particular to the movement control of the movable unit when the hand-shake quantity is too large to move the movable unit in a manner corresponding to the amount of hand-shake and necessary to perform the anti-shake operation correctly.

2. Description of the Related Art

An anti-shake apparatus for a photographing apparatus is proposed. The anti-shake apparatus applies correction for hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. H11-218794 discloses an anti-shake apparatus that restrains the gain of the driving force for the movable unit so that it restrains the oscillation of the movable unit, when the position of the movable unit is over the reference range of movement.

However, in this anti-shake apparatus, the movement control of the movable unit does not have a quick response, because the movement control of the movable unit is performed by a weak driving force. Therefore, anti-shake operation may be performed under a condition where the movable unit cannot be correctly moved corresponding to the hand-shake.

SUMMARY OF THE INVENTION

Therefore, an object of the present invention is to provide an anti-shake apparatus that limits the movement control of the movable unit when the movable unit cannot be moved corresponding to the hand-shake correctly.

According to the present invention, an anti-shake apparatus of a photographing apparatus comprises a movable unit and a controller. The controller performs movement control of the movable unit for anti-shake operation. The movement control is set to the OFF state when the movable unit comes into contact with the edge of its range of movement under a predetermined condition.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
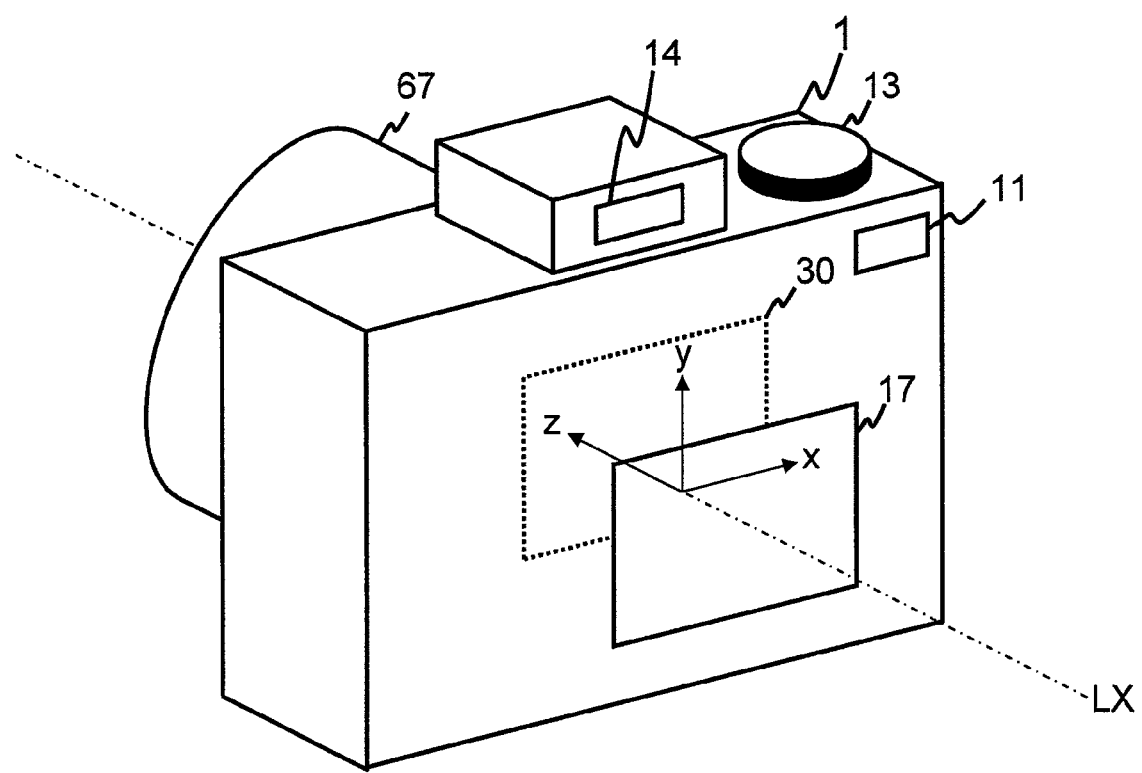
FIG. 1 is a perspective view of the first and second embodiments of the photographing apparatus viewed from the back side.

The present invention is described below with reference to the first and second embodiments shown in the drawings. In the first and second embodiments, the photographing apparatus 1 is a digital camera. A camera lens 67 of the photographing apparatus 1 has an optical axis LX.

In order to explain the direction in the first and second embodiments, a first direction x, a second direction y, and a third direction z are defined (see FIG. 1). The first direction x is a direction which is perpendicular to the optical axis LX. The second direction y is a direction which is perpendicular to the optical axis LX and the first direction x. The third direction z is a direction which is parallel to the optical axis LX and perpendicular to both the first direction x and the second direction y.

The first embodiment is explained as follows.

Figure 2:
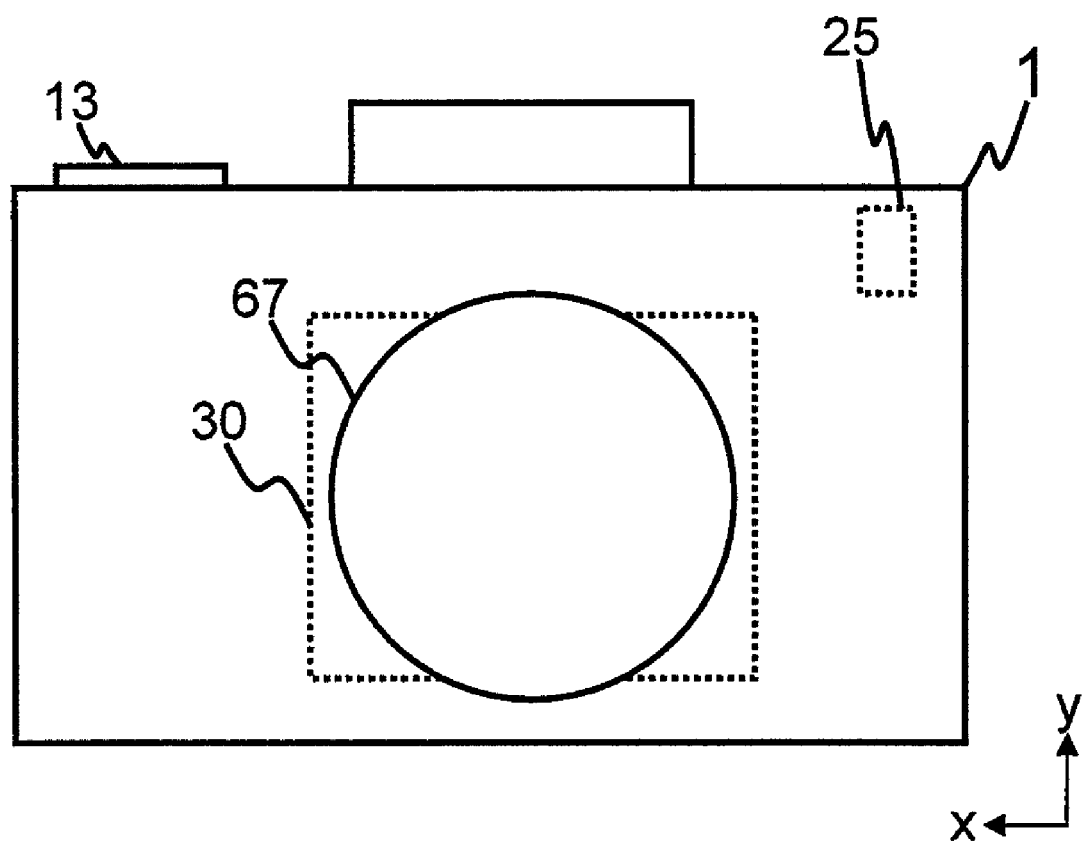
FIG. 2 is a front view of the photographing apparatus.
Figure 3:
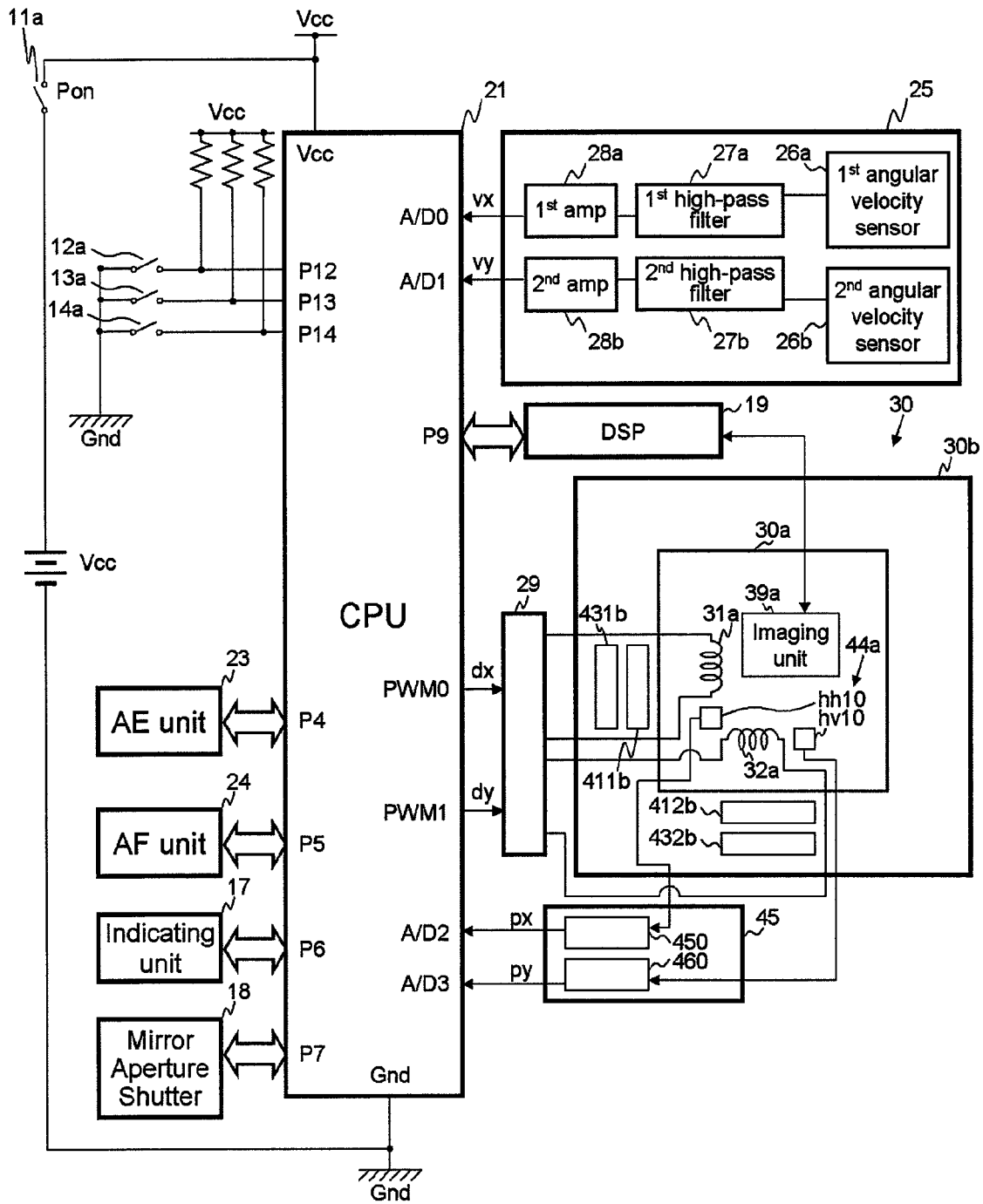
FIG. 3 is a circuit construction diagram of the photographing apparatus.

The imaging part of the photographing apparatus 1 comprises a PON button 11, a PON switch 11a, a photometric switch 12a, a release button 13, a release switch 13a, an anti-shake button 14, an anti-shake switch 14a, an indicating unit 17 such as an LCD monitor etc., a mirror-aperture-shutter unit 18, a DSP 19, a CPU 21, an AE (automatic exposure) unit 23, an AF (automatic focus) unit 24, an imaging unit 39a in the anti-shake unit 30, and a camera lens 67 (see FIGS. 1, 2, and 3).

Whether the PON switch 11a is in the ON state or the OFF state, is determined by the state of the PON button 11, so that the ON/OFF states of the photographing apparatus 1 correspond to the ON/OFF states of the PON switch 11a.

The photographic subject image is captured as an optical image through the camera lens 67 by the imaging unit 39a, and the captured image is displayed on the indicating unit 17. The photographic subject image can be optically observed by the optical finder (not depicted).

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation by the imaging unit 39a (the imaging apparatus) is performed, and the image, which is captured, is stored.

In the first embodiment, the anti-shake operation is performed from the point when the release switch 13a is set to the ON state, to the point when the release sequence operation is finished, and when the value of the drive OFF parameter SP is set to 0.

The mirror-aperture-shutter unit 18 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter corresponding to the ON state of the release switch 13a.

The DSP 19 is connected to port P9 of the CPU 21, and it is connected to the imaging unit 39a. Based on a command from the CPU 21, the DSP 19 performs the calculation operations, such as the image processing operation etc., on the image signal obtained by the imaging operation of the imaging unit 39a.

The CPU 21 is a control apparatus that controls each part of the photographing apparatus 1 regarding the imaging operation and the anti-shake operation. The anti-shake operation includes both the movement of the movable unit 30a and position-detection efforts.

Further, the CPU 21 stores a value of the anti-shake parameter IS that determines whether the photographing apparatus 1 is in the anti-shake mode or not, a first direction maximum value maxPx, a second direction maximum value maxPy, a first direction minimum value minPx, a second direction minimum value minPy, a value of a release state parameter RP, a first direction maximum parameter X(+), a first direction minimum parameter X(−), a second direction maximum parameter Y(+), a second direction minimum parameter Y(−), and a drive OFF parameter SP.

The value of the release state parameter RP changes with respect to the release sequence operation. When the release sequence operation is performed, the value of the release state parameter RP is set to 1 (see steps S22 to S30 in FIG. 4), and when the release sequence operation is finished, the value of the release state parameter RP is set (reset) to 0 (see steps S13 and S30 in FIG. 4).

The first direction maximum value maxPx is a fixed value that indicates the position of one of the ends (edges) of the range of movement of the movable unit 30a in the first direction x.

The first direction minimum value minPx is a fixed value that indicates the position of the other end of the range of movement of the movable unit 30a in the first direction x.

The second direction maximum value maxPy is a fixed value that indicates the position of one of the ends of the range of movement of the movable unit 30a in the second direction y.

The second direction minimum value minPy is a fixed value that indicates the position of the other end of the range of movement of the movable unit 30a in the second direction y.

In the case that the range of its movement forms a square shape so that the length of its range of movement in the first direction x and the length of its range of movement in the second direction y are the same, the first direction maximum value maxPx is the same as the second direction maximum value maxPy and the first direction minimum value minPx is the same as the second direction minimum value minPy.

When the value of the coordinate of the position $P_n$ after A/D conversion in the first direction x: $pdx_n$, which indicates the position of the movable unit 30a in the first direction x, is greater than or equal to the first direction maximum value maxPx; in other words, when the movable unit 30a comes into contact with a part at one of the ends of its range of movement in the first direction x, the first direction maximum parameter X(+) is set to 1; otherwise the first direction maximum parameter X(+) is set to 0.

When the value of the coordinate of the position $P_n$ after A/D conversion in the first direction x: $pdx_n$, which indicates the position of the movable unit 30a in the first direction x, is less than or equal to the first direction minimum value minPx; in other words, when the movable unit 30a comes into contact with a part at the other end of its range of movement in the first direction x, the first direction minimum parameter X(−) is set to 1; otherwise the first direction minimum parameter X(−) is set to 0.

When the value of the coordinate of the position $P_n$ after A/D conversion in the second direction y: $pdy_n$, which indicates the position of the movable unit 30a in the second direction y, is greater than or equal to the second direction maximum value maxPy; in other words, when the movable unit 30a comes into contact with a part at one of the ends of its range of movement in the second direction y, the second direction maximum parameter Y(+) is set to 1; otherwise the second direction maximum parameter Y(+) is set to 0.

When the value of the coordinate of the position $P_n$ after A/D conversion in the second direction y: $pdy_n$, which indicates the position of the movable unit 30a in the second direction y, is less than or equal to the second direction minimum value minPy; in other words, when the movable unit 30a comes into contact with a part at the other end of its range of movement in the second direction y, the second direction minimum parameter Y(−) is set to 1; otherwise the second direction minimum parameter Y(−) is set to 0.

The CPU 21 performs the release sequence operation after the release switch 13a is set to the ON state.

The drive OFF parameter SP is used to determine if the movable unit 30a comes into contact with an end of its range of movement under a predetermined condition. In the first embodiment, as the predetermined condition, when the movable unit 30a comes into contact with both ends of its range of movement in the first direction x or the second direction y, the drive OFF parameter SP is set to 1 so that the movement control of the movable unit 30a is set to the OFF state. However, the predetermined condition is not limited to this state.

Figure 4:
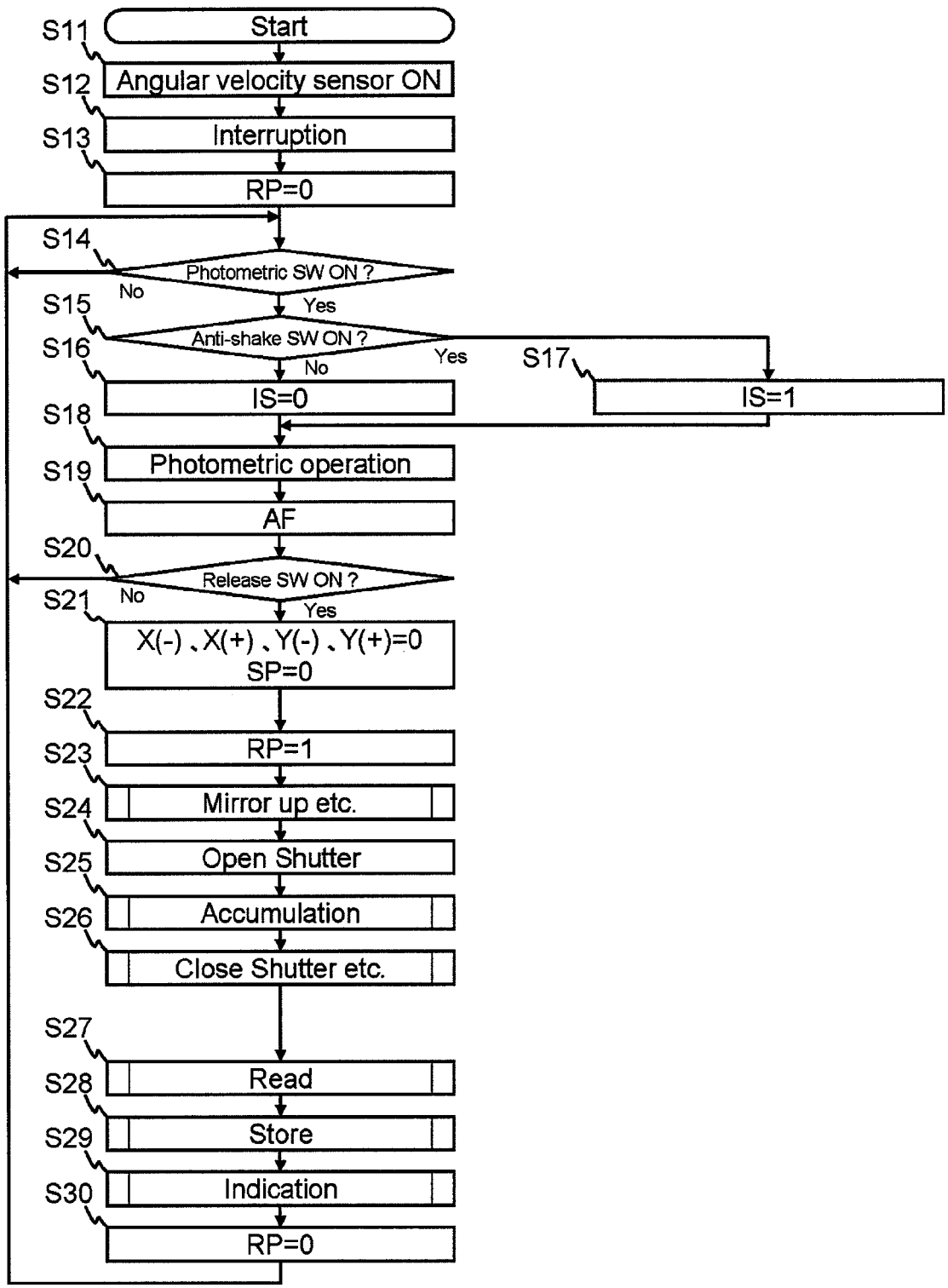
FIG. 4 is a flowchart that shows the main operation of the photographing apparatus in the first embodiment.

The value of the drive OFF parameter SP is set to 1 when the release sequence operation is being performed after the release switch 13a is set to the ON state (when the value of the release state parameter RP is set to 1, see steps S22 to S30 in FIG. 4), and either of, when the first direction maximum parameter X(+) and the first direction minimum parameter X(−) are set to 1, and when the second direction maximum parameter Y(+) and the second direction minimum parameter Y(−) are set to 1. In this case, the CPU 21 sets the movement (driving) control of the movable unit 30a to the OFF state, even if the photographing apparatus 1 is in the exposure process (see step S53 in FIG. 5).

In the case that the value of the drive OFF parameter SP is set to 1, the hand-shake quantity is too large to move the movable unit 30a corresponding to the amount of hand-shake and perform the anti-shake operation correctly, which results in the photographing apparatus 1 being in a state where the movable unit 30a has come into contact with both ends of its range of movement.

Such a state can occur when the photographing apparatus 1 is installed on a tripod and when a vibration caused by the pushing operation of the release button 13 produces resonance in the tripod, or when an oscillation larger than normal hand-shake, such as waving the photographing apparatus 1, occurs, etc.

In this case, the movable unit 30a oscillates in a manner such that the imaging operation is performed under a condition where the photographing operation corresponding to the operator's intentions cannot be performed; in other words, the movement control of the movable unit 30a for anti-shake operation cannot be performed correctly, which means that the anti-shake operation cannot be performed correctly. Further, in the case where the impact between the movable unit 30a and the contacting part is large, the contacting part may break.

In the first embodiment, when the value of the drive OFF parameter SP is set to 1, the movement control of the movable unit 30a is set to the OFF state so that unnecessary movement of the movable unit 30a is limited. By limiting the unnecessary movement of the movable unit 30a, the consumption of electrical power of the photographing apparatus 1 can be reduced.

The value of the drive OFF parameter SP is not set to 1 (continuously set to 0) when the release sequence operation is being performed, after the release switch 13a is set to the ON state (when the value of the release state parameter RP is set to 1; see steps S22 to S30 in FIG. 4), when the first direction maximum parameter X(+) and the first direction minimum parameter X(−) are not set to 1, and when the second direction maximum parameter Y(+) and the second direction minimum parameter Y(−) are not set to 1. In this case, the CPU 21 sets the movement (driving) control of the movable unit 30a to the ON state.

Further, the CPU 21 stores values of a first digital angular velocity signal $Vx_n$, a second digital angular velocity signal $Vy_n$, a first digital angular velocity $VVx_n$, a second digital angular velocity $VVy_n$, a digital displacement angle $Bx_n$, a second digital displacement angle $By_n$, a coordinate of position $S_n$ in the first direction x: $Sx_n$, a coordinate of position $S_n$ in the second direction y: $Sy_n$, a first driving force $Dx_n$, a second driving force $Dy_n$, a coordinate of position $P_n$ after A/D conversion in the first direction x: $pdx_n$, a coordinate of position $P_n$ after A/D conversion in the second direction y: $pdy_n$, a first subtraction value $ex_n$, a second subtraction value $ey_n$, a first proportional coefficient Kx, a second proportional coefficient Ky, a sampling cycle θ of the anti-shake operation, a first integral coefficient Tix, a second integral coefficient Tiy, a first differential coefficient Tdx, and a second differential coefficient Tdy.

The AE unit (an exposure calculating unit) 23 performs the photometric operation and calculates the photometric values, based on the subject being photographed. The AE unit 23 also calculates the aperture value and the time length of the exposure, with respect to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The anti-shake part of (the anti-shake apparatus) the photographing apparatus 1 comprises an anti-shake button 14, an anti-shake switch 14a, an indicating unit 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is changed to the ON state so that the anti-shake operation, in which the angular velocity detection unit 25 and the anti-shake unit 30 are driven independently of the other operations which include the photometric operation etc., is carried out for the predetermined time interval. When the anti-shake switch 14a is in the ON state, in other words in the anti-shake mode, the anti-shake parameter IS is set to 1 (IS=1). When the anti-shake switch 14a is not in the ON state, in other words in the non-anti-shake mode, the anti-shake parameter IS is set to 0 (IS=0). In the first embodiment, the value of the predetermined time interval is set to 1 ms.

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. The information regarding whether the anti-shake switch 14a is in the ON state or OFF state is input to port P14 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The indicating unit 17 is connected to port P6 of the CPU 21 for inputting and outputting signals.

Next, the details of the input and output relationships between the CPU 21 and the angular velocity detection unit 25, the driver circuit 29, the anti-shake unit 30, and the hall-element signal-processing unit 45 are explained.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the second direction y (the velocity-component in the first direction x of the angular velocity of the photographing apparatus 1). The first angular velocity sensor 26a is a gyro sensor that detects a yawing angular velocity.

The second angular velocity sensor 26b detects the angular velocity of a rotary motion (the pitching) of the photographing apparatus 1 about the axis of the first direction x (detects the velocity-component in the second direction y of the angular velocity of the photographing apparatus 1). The second angular velocity sensor 26b is a gyro sensor that detects a pitching angular velocity.

The first high-pass filter circuit 27a reduces a low frequency component of the signal output from the first angular velocity sensor 26a, because the low frequency component of the signal output from the first angular velocity sensor 26a includes signal elements that are based on a null voltage and a panning-motion, neither of which are related to hand-shake.

The second high-pass filter circuit 27b reduces a low frequency component of the signal output from the second angular velocity sensor 26b, because the low frequency component of the signal output from the second angular velocity sensor 26b includes signal elements that are based on a null voltage and a panning-motion, neither of which are related to hand-shake.

The first amplifier 28a amplifies a signal regarding the yawing angular velocity, whose low frequency component has been reduced, and outputs the analog signal to the A/D converter A/D 0 of the CPU 21 as a first angular velocity vx.

The second amplifier 28b amplifies a signal regarding the pitching angular velocity, whose low frequency component has been reduced, and outputs the analog signal to the A/D converter A/D 1 of the CPU 21 as a second angular velocity vy.

The reduction of the low frequency signal component is a two-step process; the primary part of the analog high-pass filter processing operation is performed first by the first and second high-pass filter circuits 27a and 27b, followed by the secondary part of the digital high-pass filter processing operation that is performed by the CPU 21.

The cut off frequency of the secondary part of the digital high-pass filter processing operation is higher than that of the primary part of the analog high-pass filter processing operation.

In the digital high-pass filter processing operation, the value of a time constant (a first high-pass filter time constant hx and a second high-pass filter time constant hy) can be easily changed.

The supply of electric power to the CPU 21 and each part of the angular velocity detection unit 25 begins after the PON switch 11a is set to the ON state (the main power supply is set to the ON state). The calculation of a hand-shake quantity begins after the PON switch 11a is set to the ON state.

The CPU 21 converts the first angular velocity vx, which is input to the A/D converter A/D 0, to a first digital angular velocity signal $Vx_n$ (A/D conversion operation); calculates a first digital angular velocity $VVx_n$ by reducing a low frequency component of the first digital angular velocity signal $Vx_n$ (the digital high-pass filter processing operation) because the low frequency component of the first digital angular velocity signal $Vx_n$ includes signal elements that are based on a null voltage and a panning-motion, neither of which are related to hand-shake; and calculates a hand shake quantity (a hand shake displacement angle: a first digital displacement angle $Bx_n$) by integrating the first digital angular velocity $VVx_n$ (the integration processing operation).

Similarly the CPU 21 converts the second angular velocity vy, which is input to the A/D converter A/D 1, to a second digital angular velocity signal $Vy_n$ (A/D conversion operation); calculates a second digital angular velocity $VVy_n$ by reducing a low frequency component of the second digital angular velocity signal $Vy_n$ (the digital high-pass filter processing operation) because the low frequency component of the second digital angular velocity signal $Vy_n$ includes signal elements that are based on a null voltage and a panning-motion, neither of which are related to hand-shake; and calculates a hand shake quantity (a hand shake displacement angle: a second digital displacement angle $By_n$) by integrating the second digital angular velocity $VVy_n$ (the integration processing operation).

Accordingly, the CPU 21 and the angular velocity detection unit 25 use a function to calculate the hand-shake quantity.

"n" is an integer that is greater than 1, and indicates a length of time (ms) from the point when the interruption process of the timer commences, (t=1, and see step S12 in FIG. 4) to the point when the latest anti-shake operation is performed (t=n).

Figure 6:
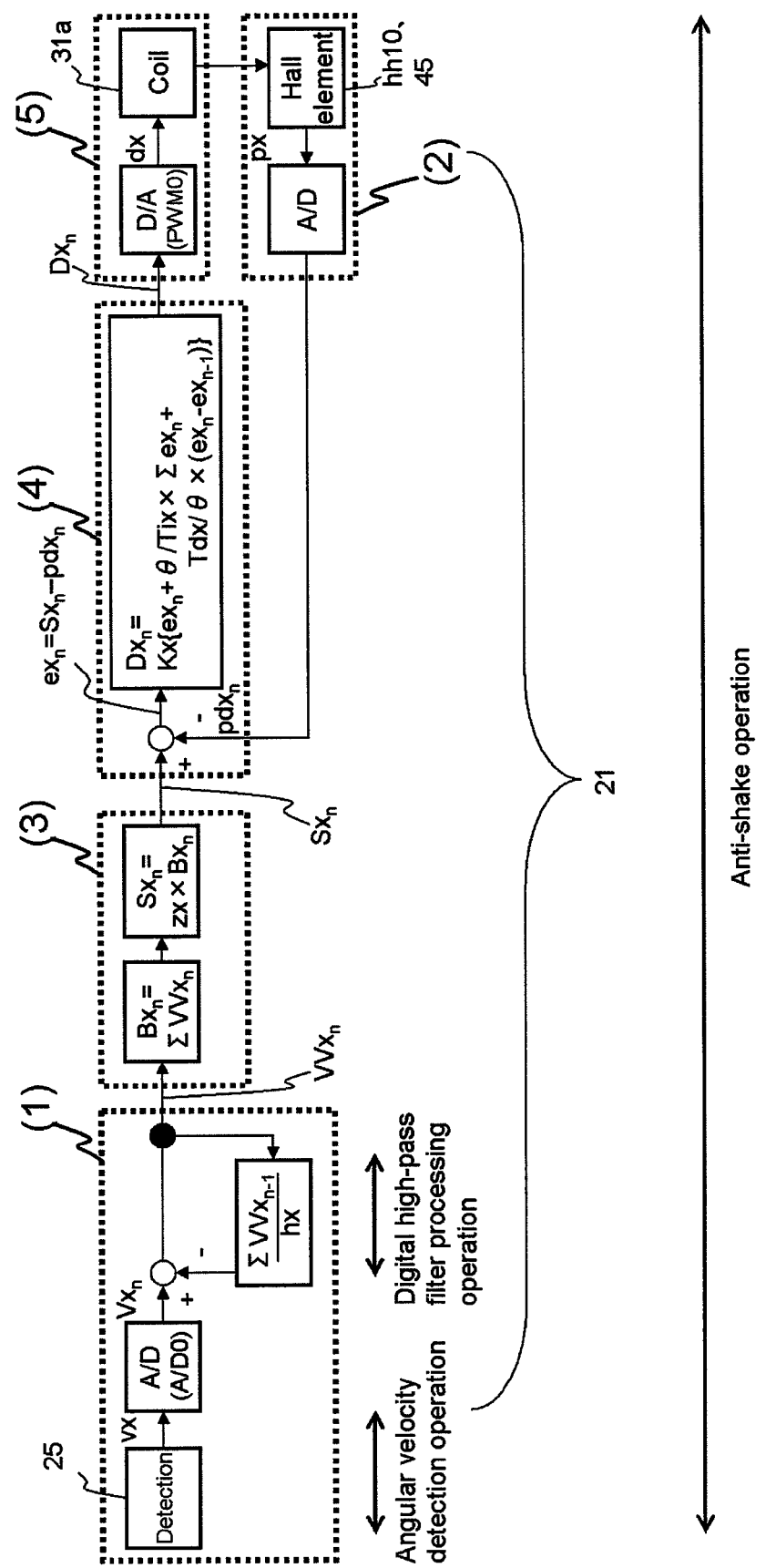
FIG. 6 is a figure that shows calculations in the anti-shake operation.

In the digital high-pass filter processing operation regarding the first direction x, the first digital angular velocity $VVx_n$ is calculated by dividing the summation of the first digital angular velocity $VVx_1$ to $VVx_{n-1}$ calculated by the interruption process of the timer before the 1 ms predetermined time interval (before the latest anti-shake operation is performed), by the first high-pass filter time constant hx, and then subtracting the resulting quotient from the first digital angular velocity signal $Vx_n$ ($VVx_n=Vx_n-(\Sigma VVx_{n-1})\div hx$, see (1) in FIG. 6).

In the digital high-pass filter processing operation regarding the second direction y, the second digital angular velocity $VVy_n$ is calculated by dividing the summation of the second digital angular velocity $VVy_1$ to $VVy_{n-1}$ calculated by the interruption process of the timer before the 1 ms predetermined time interval (before the latest anti-shake operation is performed), by the second high-pass filter time constant hy, and then subtracting the resulting quotient from the second digital angular velocity signal $Vy_n$ ($VVy_n=Vy_n-(\Sigma Vy_{n-1})\div hy$).

In the first embodiment, the angular velocity detection operation in (portion of) the interruption process of the timer includes a process in the angular velocity detection unit 25 and a process of inputting process of the first and second angular velocities vx and vy from the angular velocity detection unit 25 to the CPU 21.

In the integration processing operation regarding the first direction x, the first digital displacement angle $Bx_n$ is calculated by the summation from the first digital angular velocity $VVx_1$ at the point when the interruption process of the timer commences, t=1, (see step S12 in FIG. 4) to the first digital angular velocity $VVx_n$ at the point when the latest anti-shake operation is performed (t=n), ($Bx_n=\Sigma VVx_n$, see (3) in FIG. 6).

Similarly, in the integration processing operation regarding the second direction y, the second digital displacement angle $By_n$ is calculated by the summation from the second digital angular velocity $VVy_1$ at the point when the interruption process of the timer commences to the second digital angular velocity $VVy_n$ at the point when the latest anti-shake operation is performed ($By_n=\Sigma VVy_n$).

The CPU 21 calculates the position $S_n$ where the imaging unit 39a (the movable unit 30a) should be moved, corresponding to the hand-shake quantity (the first and second digital displacement angles $Bx_n$ and $By_n$) calculated for the first direction x and the second direction y, based on a position conversion coefficient zz (a first position conversion coefficient zx for the first direction x and a second position conversion coefficient zy for the second direction y).

The coordinate of position $S_n$ in the first direction x is defined as $Sx_n$, and the coordinate of position $S_n$ in the second direction y is defined as $Sy_n$. The movement of the movable unit 30a, which includes the imaging unit 39a, is performed by using electromagnetic force and is described later.

The driving force $D_n$ drives the driver circuit 29 in order to move the movable unit 30a to the position $S_n$. The coordinate of the driving force $D_n$ in the first direction x is defined as the first driving force $Dx_n$ (after D/A conversion: a first PWM duty dx). The coordinate of the driving force $D_n$ in the second direction y is defined as the second driving force $Dy_n$ (after D/A conversion: a second PWM duty dy).

In a positioning operation regarding the first direction x, the coordinate of position $S_n$ in the first direction x is defined as $Sx_n$, and is the product of the latest first digital displacement angle $Bx_n$ and the first position conversion coefficient zx ($Sx_n=zx\times Bx_n$, see (3) in FIG. 6).

In a positioning operation regarding the second direction y, the coordinate of position $S_n$ in the second direction y is defined as $Sy_n$, and is the product of the latest second digital displacement angle $By_n$ and the second position conversion coefficient zy ($Sy_n=zy\times By_n$).

The anti-shake unit 30 is an apparatus that corrects for the hand-shake effect by moving the imaging unit 39a to the position $S_n$, by canceling the lag of the photographing subject image on the imaging surface of the imaging device of the imaging unit 39a, and by stabilizing the photographing subject image displayed on the imaging surface of the imaging device, during the exposure time and when the anti-shake operation is performed (IS=1).

The anti-shake unit 30 has a fixed unit 30b, and a movable unit 30a which includes the imaging unit 39a and can be moved about on the xy plane.

During the exposure time when the anti-shake operation is not performed (IS=0), the movable unit 30a is fixed to (held at) a predetermined position. In the first embodiment, the predetermined position is at the center of the range of movement.

In the release sequence operation after the release switch 13a is set to the ON state, and in a time period excepting when the value of the drive OFF parameter SP is set to 0, the movement (driving) control of the movable unit 30a is not performed.

The anti-shake unit 30 does not have a fixed-positioning mechanism that maintains the movable unit 30a in a fixed (held) position when the movable unit 30a is not being driven (drive OFF state).

The driving of the movable unit 30a of the anti-shake unit 30, including movement to a predetermined fixed position, is performed by the electromagnetic force of the coil unit for driving and the magnetic unit for driving, through the driver circuit 29 which has the first PWM duty dx input from the PWM 0 of the CPU 21 and has the second PWM duty dy input from the PWM 1 of the CPU 21 (see (5) in FIG. 6).

The detected-position $P_n$ of the movable unit 30a, either before or after the movement effected by the driver circuit 29, is detected by the hall element unit 44a and the hall-element signal-processing unit 45.

Information regarding the first coordinate of the detected-position $P_n$ in the first direction x, in other words a first detected-position signal px, is input to the A/D converter A/D 2 of the CPU 21 (see (2) in FIG. 6). The first detected-position signal px is an analog signal that is converted to a digital signal by the A/D converter A/D 2 (A/D conversion operation). The first coordinate of the detected-position $P_n$ in the first direction x, after the A/D conversion operation, is defined as $pdx_n$ and corresponds to the first detected-position signal px.

Information regarding the second coordinate of the detected-position $P_n$ in the second direction y, in other words a second detected-position signal py, is input to the A/D converter A/D 3 of the CPU 21. The second detected-position signal py is an analog signal that is converted to a digital signal by the A/D converter A/D 3 (A/D conversion operation). The second coordinate of the detected-position $P_n$ in the second direction y, after the A/D conversion operation, is defined as $pdy_n$ and corresponds to the second detected-position signal py.

The PID (Proportional Integral Differential) control calculates the first and second driving forces $Dx_n$ and $Dy_n$ on the basis of the coordinate data for the detected-position $P_n$ ($pdx_n$, $pdy_n$) and the position $S_n$ ($Sx_n$, $Sy_n$) following movement.

The calculation of the first driving force $Dx_n$ is based on the first subtraction value $ex_n$, the first proportional coefficient Kx, the sampling cycle $\theta$, the first integral coefficient Tix, and the first differential coefficient Tdx ($Dx_n = Kx \times \{ex_n + \theta \div Tix \times \Sigma ex_n + Tdx \div \theta \times (ex_n - ex_{n-1})\}$, see (4) in FIG. 6). The first subtraction value $ex_n$ is calculated by subtracting the first coordinate of the detected-position $P_n$ in the first direction x after the A/D conversion operation, $pdx_n$, from the coordinate of position $S_n$ in the first direction x, $Sx_n$ ($ex_n = Sx_n - pdx_n$).

The calculation of the second driving force $Dy_n$ is based on the second subtraction value $ey_n$, the second proportional coefficient Ky, the sampling cycle $\theta$, the second integral coefficient Tiy, and the second differential coefficient Tdy ($Dy_n = Ky \times \{ey_n + \theta \div Tiy \times \Sigma ey_n + Tdy \div \theta \times (ey_n - ey_{n-1})\}$). The second subtraction value $ey_n$ is calculated by subtracting the second coordinate of the detected-position $P_n$ in the second direction y after the A/D conversion operation, $pdy_n$, from the coordinate of position $S_n$ in the second direction y, $Sy_n$ ($ey_n = Sy_n - pdy_n$).

The value of the sampling cycle $\theta$ is set to a predetermined time interval of 1 ms.

Driving the movable unit 30a to the position $S_n$, ($Sx_n$,$Sy_n$) corresponding to the anti-shake operation of the PID control, is performed when the photographing apparatus 1 is in the anti-shake mode (IS=1) where the anti-shake switch 14a is set to the ON state.

When the anti-shake parameter IS is 0, the PID control that does not correspond to the anti-shake operation is performed so that the movable unit 30a is moved to the center of the range of movement (the predetermined position).

The movable unit 30a has a coil unit for driving that is comprised of a first driving coil 31a and a second driving coil 32a, an imaging unit 39a that has the imaging device, and a hall element unit 44a as a magnetic-field change-detecting element unit. In the first embodiment, the imaging device is a CCD; however, the imaging device may be another imaging device such as a CMOS etc.

The fixed unit 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed unit 30b movably supports the movable unit 30a in the first direction x and in the second direction y.

When the center area of the imaging device is intersected by the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device.

A rectangle shape, which is the form of the imaging surface of the imaging device, has two diagonal lines. In the first embodiment, the center of the imaging device is at the intersection of these two diagonal lines.

The first driving coil 31a, the second driving coil 32a, and the hall element unit 44a are attached to the movable unit 30a.

The first driving coil 31a forms a seat and a spiral shaped coil pattern. The coil pattern of the first driving coil 31a has lines which are parallel to the second direction y, thus creating the first electro-magnetic force to move the movable unit 30a that includes the first driving coil 31a, in the first direction x.

The first electro-magnetic force occurs on the basis of the current direction of the first driving coil 31a and the magnetic-field direction of the first position-detecting and driving magnet 411b.

The second driving coil 32a forms a seat and a spiral shaped coil pattern. The coil pattern of the second driving coil 32a has lines which are parallel to the first direction x, thus creating the second electromagnetic force to move the movable unit 30a that includes the second driving coil 32a, in the second direction y.

The second electro-magnetic force occurs on the basis of the current direction of the second driving coil 32a and the magnetic-field direction of the second position-detecting and driving magnet 412b.

The first and second driving coils 31a and 32a are connected to the driver circuit 29, which drives the first and second driving coils 31a and 32a, through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a that corresponds to the value of the first PWM duty dx, and to the second driving coil 32a that corresponds to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the fixed unit 30b, on the side of the movable unit 30a, in the third direction z.

The second position-detecting and driving magnet 412b is attached to the second position-detecting and driving yoke 432b, under the condition where the N pole and S pole are arranged in the second direction y. The second position-detecting and driving yoke 432b is attached to the fixed unit 30b, on the side of the movable unit 30a, in the third direction z.

The first and second position-detecting and driving yokes 431b, 432b are made of a soft magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element unit 44a is a single-axis unit that contains two magnetoelectric converting elements (magnetic-field change-detecting elements) utilizing the Hall Effect to detect the first detected-position signal px and the second detected-position signal py specifying the first coordinate in the first direction x and the second coordinate in the second direction y, respectively, of the present position $P_n$ of the movable unit 30a.

One of the two hall elements is a horizontal hall element hh10 for detecting the first coordinate of the position $P_n$ of the movable unit 30a in the first direction x, and the other is a vertical hall element hv10 for detecting the second coordinate of the position $P_n$ of the movable unit 30a in the second direction y.

The horizontal hall element hh10 is attached to the movable unit 30a, where the horizontal hall element hh10 faces the first position-detecting and driving magnet 411b of the fixed unit 30b in the third direction z.

The vertical hall element hv10 is attached to the movable unit 30a, where the vertical hall element hv10 faces the second position-detecting and driving magnet 412b of the fixed unit 30b in the third direction z.

When the center of the imaging device intersects the optical axis LX, it is desirable to have the horizontal hall element hh10 positioned on the hall element unit 44a facing an intermediate area between the N pole and S pole of the first position-detecting and driving magnet 411b in the first direction x, as viewed from the third direction z. In this position, the horizontal hall element hh10 utilizes the maximum range in which an accurate position-detecting operation can be performed based on the linear output-change (linearity) of the single-axis hall element.

Similarly, when the center of the imaging device intersects the optical axis LX, it is desirable to have the vertical hall element hv10 positioned on the hall element unit 44a facing an intermediate area between the N pole and S pole of the second position-detecting and driving magnet 412b in the second direction y, as viewed from the third direction z.

The hall-element signal-processing unit 45 has a first hall-element signal-processing circuit 450 and a second hall-element signal-processing circuit 460.

The first hall-element signal-processing circuit 450 detects a horizontal potential-difference x10 between the output terminals of the horizontal hall element hh10 that is based on an output signal of the horizontal hall element hh10.

The first hall-element signal-processing circuit 450 outputs the first detected-position signal px, which specifies the first coordinate of the position $P_n$ of the movable unit 30a in the first direction x, to the A/D converter A/D 2 of the CPU 21, on the basis of the horizontal potential-difference x10.

The second hall-element signal-processing circuit 460 detects a vertical potential-difference y10 between the output terminals of the vertical hall element hv10 that is based on an output signal of the vertical hall element hv10.

The second hall-element signal-processing circuit 460 outputs the second detected-position signal py, which specifies the second coordinate of the position $P_n$ of the movable unit 30a in the second direction y, to the A/D converter A/D 3 of the CPU 21, on the basis of the vertical potential-difference y10.

Next, the main operation of the photographing apparatus 1 in the first embodiment is explained by using the flowchart in FIG. 4.

When the photographing apparatus 1 is set to the ON state, the electrical power is supplied to the angular velocity detection unit 25 so that the angular velocity detection unit 25 is set to the ON state in step S11.

In step S12, the interruption process of the timer at the predetermined time interval (1 ms) commences. In step S13, the value of the release state parameter RP is set to 0. The detail of the interruption process of the timer in the first embodiment is explained later by using the flowchart in FIG. 5.

In step S14, it is determined whether the photometric switch 12a is set to the ON state. When it is determined that the photometric switch 12a is not set to the ON state, the operation returns to step S14 and the process in step S14 is repeated. Otherwise, the operation continues on to step S15.

In step S15, it is determined whether the anti-shake switch 14a is set to the ON state. When it is determined that the anti-shake switch 14a is not set to the ON state, the value of the anti-shake parameter IS is set to 0 in step S16. Otherwise, the value of the anti-shake parameter IS is set to 1 in step S17.

In step S18, the AE sensor of the AE unit 23 is driven, the photometric operation is performed, and the aperture value and exposure time are calculated.

In step S19, the AF sensor and the lens control circuit of the AF unit 24 are driven to perform the AF sensing and focus operations, respectively.

In step S20, it is determined whether the release switch 13a is set to the ON state. When the release switch 13a is not set to the ON state, the operation returns to step S14 and the process in steps S14 to S19 is repeated. Otherwise, the operation continues on to step S21 and then the release sequence operation commences.

In step S21, the values of the first direction maximum parameter X(+), the first direction minimum parameter X(−), the second direction maximum parameter Y(+), the second direction minimum parameter Y(−), and the drive OFF parameter SP are set to 0.

In step S22, the value of the release state parameter RP is set to 1.

In step S23, the mirror-up operation and the aperture closing operation corresponding to the aperture value that is either preset or calculated, are performed by the mirror-aperture-shutter unit 18.

After the mirror-up operation is finished, the opening operation of the shutter (the movement of the front curtain in the shutter) commences in step S24.

In step S25, the exposure operation, or in other words the electric charge accumulation of the imaging device (CCD etc.), is performed. After the exposure time has elapsed, in step S26, the closing operation of the shutter (the movement of the rear curtain in the shutter) the mirror-down operation, and the opening operation of the aperture are performed by the mirror-aperture-shutter unit 18.

In step S27, the electric charge which has accumulated in the imaging device during the exposure time is read. In step S28, the CPU 21 communicates with the DSP 19 so that the image processing operation is performed based on the electric charge read from the imaging device. The image, on which the image processing operation is performed, is stored to the memory in the photographing apparatus 1. In step S29, the image that is stored in the memory is displayed on the indicating unit 17. In step S30, the value of the release state parameter RP is set to 0 so that the release sequence operation is finished, and the operation then returns to step S14, in other words the photographing apparatus 1 is set to a state where the next imaging operation can be performed.

Figure 5:
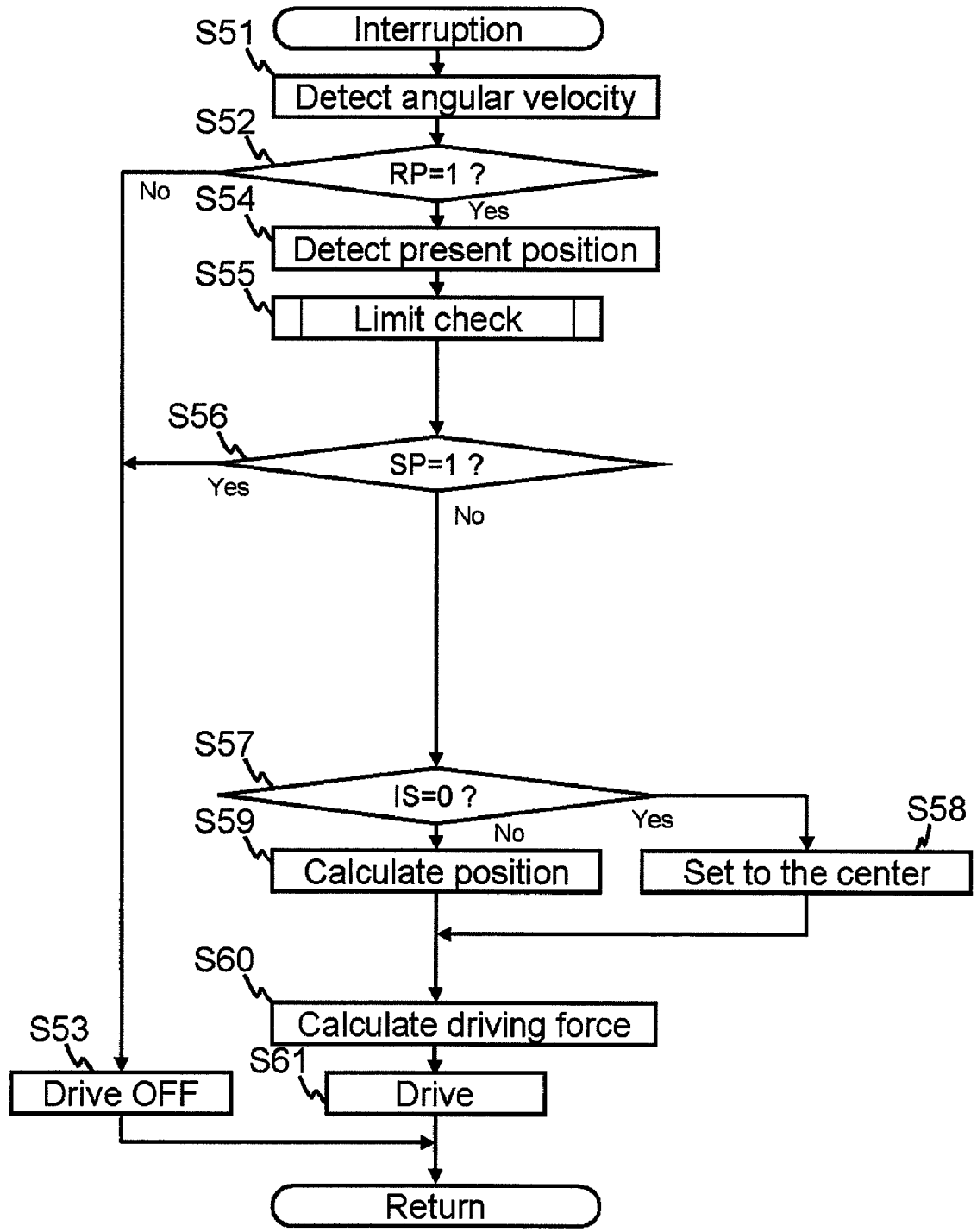
FIG. 5 is a flowchart that shows the detail of the interruption process of the timer in the first embodiment.

Next, the interruption process of the timer in the first embodiment, which commences in step S12 in FIG. 4 and is performed at every predetermined time interval (1 ms) independent of the other operations, is explained by using the flowchart in FIG. 5.

When the interruption process of the timer commences, the first angular velocity vx, which is output from the angular velocity detection unit 25, is input to the A/D converter A/D 0 of the CPU 21 and converted to the first digital angular velocity signal $Vx_n$, in step S51. The second angular velocity vy, which is also output from the angular velocity detection unit 25, is input to the A/D converter A/D 1 of the CPU 21 and converted to the second digital angular velocity signal $Vy_n$ (the angular velocity detection operation).

The low frequencies of the first and second digital angular velocity signals $Vx_n$ and $Vy_n$ are reduced in the digital high-pass filter processing operation (the first and second digital angular velocities $VVx_n$ and $VVy_n$).

In step S52, it is determined whether the value of the release state parameter RP is set to 1. When it is determined that the value of the release state parameter RP is not set to 1, driving the movable unit 30a is set to OFF state, or the anti-shake unit 30 is set to a state where the driving control of the movable unit 30a is not performed in step S53. Otherwise, the operation proceeds directly to step S54.

In step S54, the hall element unit 44a detects the position of the movable unit 30a, and the first and second detected-position signals px and py are calculated by the hall-element signal-processing unit 45. The first detected-position signal px is then input to the A/D converter A/D 2 of the CPU 21 and converted to a digital signal $pdx_n$, whereas the second detected-position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S55, it is determined whether the movable unit 30a came into contact with the both ends of its range of movement, in other words, a limit check operation is performed. The detail of the limit check operation in the first embodiment is explained later by using the flowchart in FIG. 7.

In step S56, it is determined whether the value of the drive OFF parameter SP is set to 1. When it is determined that the value of the drive OFF parameter SP is set to 1, the driving of the movable unit 30a is set to the OFF state, or the anti-shake unit 30 is set to a state where the driving control of the movable unit 30a is not performed, in step S53. Otherwise, the operation continues to step S57.

In step S57, it is determined whether the value of the anti-shake parameter IS is 0. When it is determined that the value of the anti-shake parameter IS is 0 (IS=0), in other words when the photographing apparatus is not in anti-shake mode, the position $S_n$ ($Sx_n$, $Sy_n$) where the movable unit 30a (the imaging unit 39a) should be moved is set at the center of the range of movement of the movable unit 30a, in step S58. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S59.

In step S60, the first driving force $Dx_n$ (the first PWM duty dx) and the second driving force $Dy_n$ (the second PWM duty dy) of the driving force D, which moves the movable unit 30a to the position $S_n$, are calculated on the basis of the position $S_n$ ($Sx_n$, $Sy_n$) that was determined in step S58 or step S59, and the present position $P_n$ ($pdx_n$, $pdy_n$).

In step S61, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $Sy_n$).

The process of steps S60 and S61 is an automatic control calculation that is used with the PID automatic control for performing general (normal) proportional, integral, and differential calculations.

Figure 7:
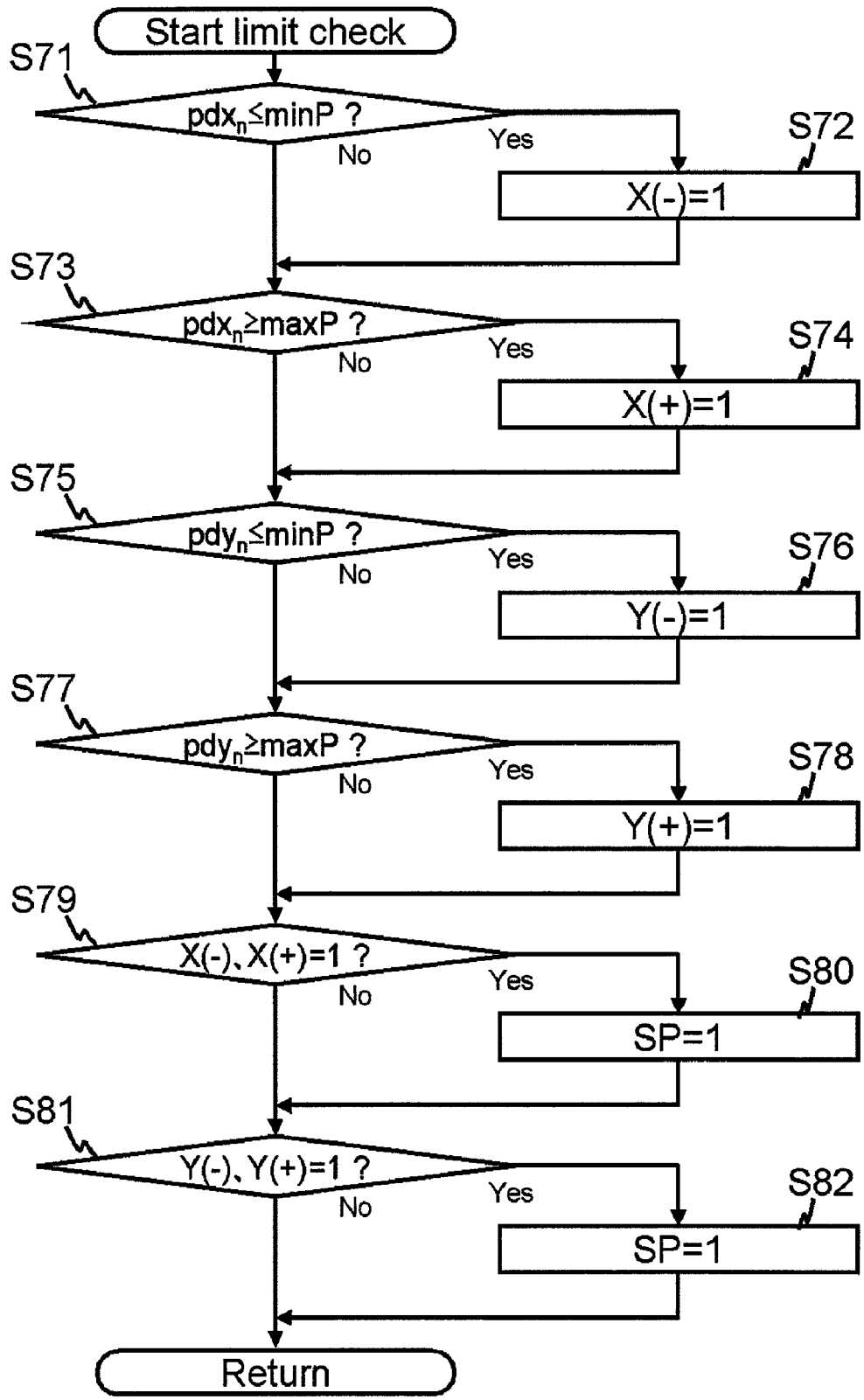
FIG. 7 is a flowchart that shows the limit check operation in the first embodiment.

Next, the limit check operation in the first embodiment, which commences in step S55 in FIG. 5, is explained by using the flowchart in FIG. 7.

When the limit check operation commences, it is determined whether the value of the first coordinate of the detected-position $P_n$ in the first direction x after the A/D conversion operation, $pdx_n$ is less than or equal to the first direction minimum value minPx, in step S71.

When it is determined that the value of the first coordinate of the detected-position $P_n$ in the first direction x after the A/D conversion operation, $pdx_n$ is less than or equal to the first direction minimum value minPx, in other words, the movable unit 30a has come into contact with the part at the other end of its range of movement in the first direction x, the first direction minimum parameter X(−) is set to 1, in step S72. Otherwise the operation proceeds directly to step S73.

In step S73, it is determined whether the value of the first coordinate of the detected-position $P_n$ in the first direction x after the A/D conversion operation, $pdx_n$ is greater than or equal to the first direction maximum value maxPx.

When it is determined that the value of the first coordinate of the detected-position $P_n$ in the first direction x after the A/D conversion operation, $pdx_n$ is greater than or equal to the first direction maximum value maxPx, in other words, the movable unit 30a has come into contact with the part at one of the ends of its range of movement in the first direction x, the first direction maximum parameter X(+) is set to 1, in step S74. Otherwise the operation proceeds directly to step S75.

In step S75, it is determined whether the value of the second coordinate of the detected-position $P_n$ in the second direction y after the A/D conversion operation, $pdy_n$ is less than or equal to the second direction minimum value minPy.

When it is determined that the value of the second coordinate of the detected-position $P_n$ in the second direction y after the A/D conversion operation, $pdy_n$ is less than or equal to the second direction minimum value minPy, in other words, the movable unit 30a has come into contact with the part at the other end of its range of movement in the second direction y, the second direction minimum parameter Y(−) is set to 1, in step S76. Otherwise the operation proceeds directly to step S77.

In step S77, it is determined whether the value of the second coordinate of the detected-position $P_n$ in the second direction y after the A/D conversion operation, $pdy_n$ is greater than or equal to the second direction maximum value maxPy.

When it is determined that the value of the second coordinate of the detected-position $P_n$ in the second direction y after the A/D conversion operation, $pdy_n$ is greater than or equal to the second direction maximum value maxPy, in other words, the movable unit 30a has come into contact with the part at one of the ends of its range of movement in the second direction y, the second direction maximum parameter Y(+) is set to 1, in step S78. Otherwise the operation proceeds directly to step S79.

In step S79, it is determined whether the values of both the first direction minimum parameter X(−) and the first direction maximum parameter X(+) are set to 1. When it is determined that both values are set to 1, the value of the drive OFF parameter SP is set to 1 in step S80. When it is determined that at least one of the values of the first direction minimum parameter X(−) and the first direction maximum parameter X(+) is not set to 1, the operation proceeds directly to step S81.

In step S81, it is determined whether the values of both the second direction minimum parameter Y(−) and the second direction maximum parameter Y(+) are set to 1. When it is determined that both values are set to 1, the value of the drive OFF parameter SP is set to 1, in step S82. When it is determined that at least one of the values of the second direction minimum parameter Y(−) and the second direction maximum parameter Y(+) is not set to 1, the limit check operation is finished.

In the first embodiment, the movement control of the movable unit 30a is set to the OFF state when the hand-shake quantity is too large to move the movable unit 30a corresponding to the large amount of hand-shake and perform the anti-shake operation correctly, which means that the photographing apparatus 1 is in a state where the movable unit 30a came into contact with both ends of its range of movement.

Such a state can occur when the photographing apparatus 1 is installed on a tripod and when a vibration caused by the pushing operation of the release button 13 produces resonance in the tripod, or when an oscillation larger than normal hand-shake, such as waving the photographing apparatus 1, occurs, etc.

In this case, the movable unit 30a oscillates such that the imaging operation is performed under a condition where the photographing operation corresponding to the operator's intentions cannot be performed; in other words, the movement control of the movable unit 30a for anti-shake operation cannot be performed correctly which means that the anti-shake operation cannot be performed correctly.

Therefore, unnecessary movement of the movable unit 30a is limited, compared to when the movement of the movable unit 30a is not set to the OFF state in such the state. Further, by limiting the unnecessary movement of the movable unit 30a, the consumption of electrical power of the photographing apparatus 1 can be reduced. Further, the possibility of the breakage of the contacting part etc. can be prevented.

Further, discomfort due to the shock caused by the impact between the movable unit 30a and the point of contact which stops its movement, felt by the operator of the photographing apparatus 1, can be reduced.

In the first embodiment, the determination of whether the hand-shake quantity is large or not, in order that the anti-shake operation can be performed correctly, is based on the position detection of the movable unit 30a (the determination of whether the movable unit 30a has come into contact with both ends of its range of movement or not). However, this determination may be based on another function. For example, the determination of whether the anti-shake operation can be performed correctly or not could be based on the detection of hand-shake quantity using the basis of the signals (vx, vy, $Vx_n$, and $Vy_n$) input to the CPU 21 from the first and second angular velocity sensors 26a and 26b. In this case, it is determined whether the hand-shake quantity calculated by the anti-shake operation is greater than an upper limited value of a predetermined range that is set in advance or less than a lower limited value of the predetermined range.

Next, the second embodiment is explained. In the first embodiment, the movement control of the movable unit 30a (driving the movable unit 30a) is set to the OFF state based on the determination of whether the movable unit 30a has come into contact with the ends of its range of movement or not.

However, in the second embodiment, the movement control of the movable unit 30a (driving the movable unit 30a) is set to the OFF state based on the state of the movement of the movable unit 30a (the movement quantity of the movable unit 30a). The points that differ from the first embodiment are explained as follows.

The CPU 21 is a control apparatus that controls each part of the photographing apparatus 1 regarding the imaging operation and the anti-shake operation. The anti-shake operation includes both the movement of the movable unit 30a and position-detection efforts.

Further, the CPU 21 stores a value of the anti-shake parameter IS that determines whether the photographing apparatus 1 is in the anti-shake mode or not, a reference movement quantity STW, a reference number of times STN, a value of a release state parameter RP, a first positive direction counter X(+)cnt, a first negative direction counter X(−)cnt, a second positive direction counter Y(+)cnt, a second negative direction counter Y(−)cnt, and a drive OFF parameter SP.

The reference movement quantity STW is a reference value (a fixed value) for comparing the first coordinate of the movement quantity of the movable unit 30a in the first direction x during the predetermined time length of 1 ms, ($|pdx_n - pdx_{n-1}|$) and the second coordinate of the movement quantity of the movable unit 30a in the second direction y during the predetermined time length of 1 ms, ($|pdy_n - pdy_{n-1}|$).

In the case that the movement quantity in the first direction x or the second direction y is greater than or equal to the reference movement quantity STW, it indicates that the movement speed of the movable unit 30a is greater than or equal to a predetermined speed.

The number of times it is determined that the movement quantity in the first direction x or the second direction y is greater than or equal to the reference movement quantity STW, is counted in the first direction x and in the second direction y respectively, and in the positive direction and in the negative direction respectively.

The reference number of times STN is a reference value (a fixed value) for comparing the number of counted times when the movement quantity in the first direction x or the second direction y is greater than or equal to the reference movement quantity STW.

When the number of the counted times is large, it is determined that the movable unit 30a is in an oscillation state, and the movement of the movable unit 30a (driving the movable unit 30a) is set to the OFF state.

In the second embodiment, the value of the reference movement quantity is set to 60 AD value/ms, and the value of the reference number of times STN is set to 5.

The sensitivity of the detection of the horizontal hall element hh10 and the vertical hall element hv10 is set to a detection voltage width of 3.3 V and a 10 bit AD ($2^{10}$=1024 steps (AD value)). Therefore, the detection voltage width per 1 step (1 AD value) is 3.3V÷1024≈3.22 mV/AD. The value of the reference movement quantity STW: 60 AD value/ms, is a detection voltage of 60÷3.22≈193 mV/ms. Further, when the movement quantity of the movable unit 30a in the predetermined time interval of 1 ms is greater than approximately 6% of a range of its movement, it is determined that the movement quantity is greater than or equal to the reference movement quantity STW (60 AD value/ms÷1024≈0.06=6%).

Figure 10:
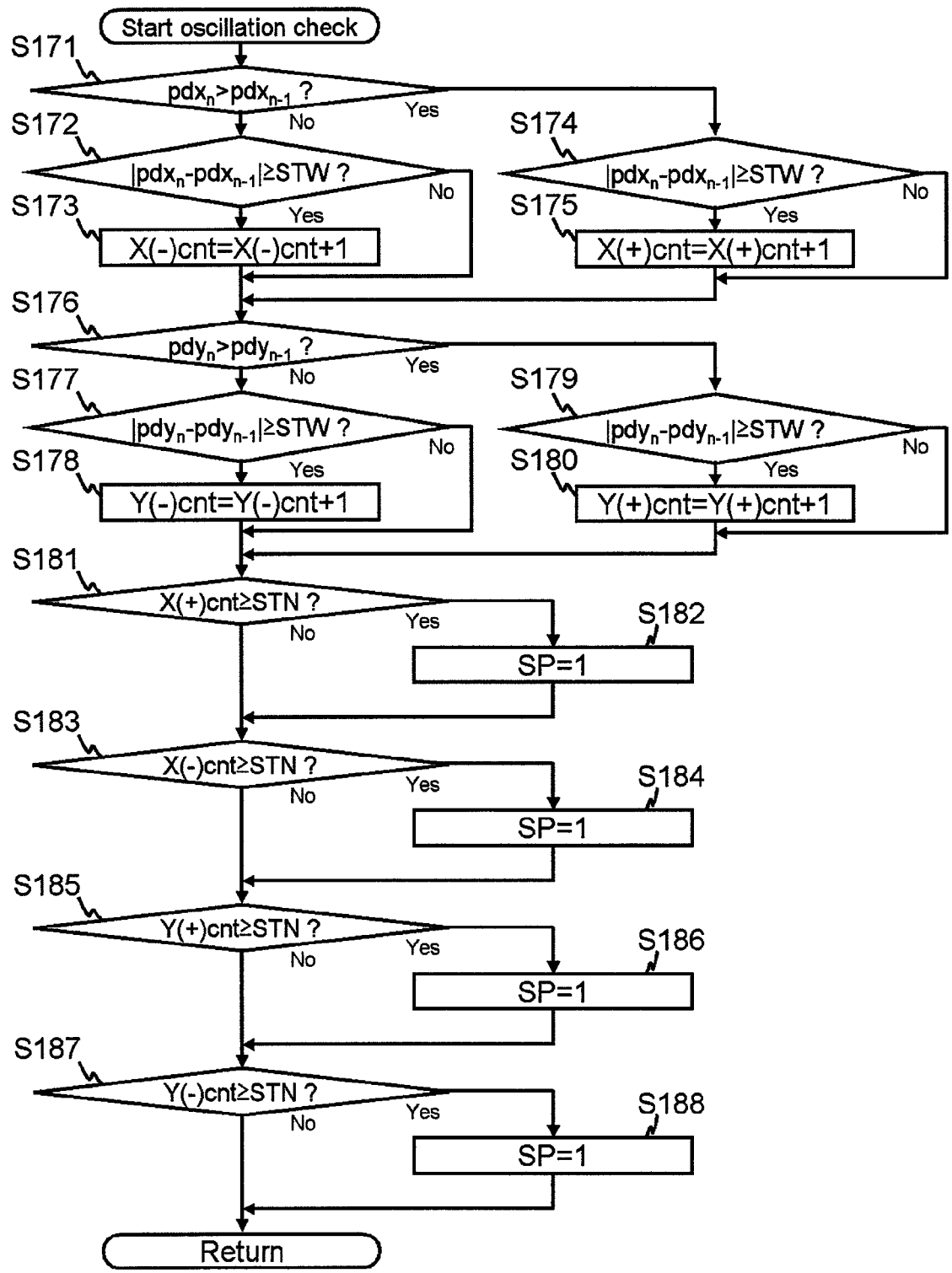
FIG. 10 is a flowchart that shows the oscillation check operation in the second embodiment.

When it is determined that the value of the first coordinate of the present detected-position $P_n$ in the first direction x after the A/D conversion operation, $pdx_n$, is greater than the value of the first coordinate of the previous detected-position $P_{n-1}$ in the first direction x after the A/D conversion operation, $pdx_{n-1}$, and the difference $|pdx_n-pdx_{n-1}|$ is greater than or equal to the reference movement quantity STW; in other words, in the case that the movable unit 30a is moving in the first direction x and in the positive direction, at over the predetermined speed, the value of the first positive direction counter X(+)cnt is increased by the value of 1 (see step S175 in FIG. 10).

When it is determined that the value of the first coordinate of the present detected-position $P_n$ in the first direction x after the A/D conversion operation, $pdx_n$, is not greater than the value of the first coordinate of the previous detected-position $P_{n-1}$ in the first direction x after the A/D conversion operation, $pdx_{n-1}$, and the difference $|pdx_n-pdx_{n-1}|$ is greater than or equal to the reference movement quantity STW; in other words, in the case that the movable unit 30a is moving in the first direction x and in the negative direction, at over the predetermined speed, the value of the first negative direction counter X(−)cnt is increased by the value of 1 (see step S173 in FIG. 10).

When it is determined that the value of the second coordinate of the present detected-position $P_n$ in the second direction y after the A/D conversion operation, $pdy_n$, is greater than the value of the second coordinate of the previous detected-position $P_{n-1}$ in the second direction y after the A/D conversion operation, $pdy_{n-1}$, and the difference $|pdy_n-pdy_{n-1}|$ is greater than or equal to the reference movement quantity STW; in other words, in the case that the movable unit 30a is moving in the second direction y and in the positive direction, at over the predetermined speed, the value of the second positive direction counter Y(+)cnt is increased by the value of 1 (see step S180 in FIG. 10).

When it is determined that the value of the second coordinate of the present detected-position $P_n$ in the second direction y after the A/D conversion operation, $pdy_n$, is not greater than the value of the second coordinate of the previous detected-position $P_{n-1}$ in the second direction y after the A/D conversion operation, $pdy_{n-1}$, and the difference $|pdy_n-pdy_{n-1}|$ is greater than or equal to the reference movement quantity STW; in other words, in the case that the movable unit 30a is moving in the second direction y and in the negative direction, at over the predetermined speed, the value of the second negative direction counter Y(−)cnt is increased by the value of 1 (see step S178 in FIG. 10).

The CPU 21 performs the release sequence operation after the release switch 13a is set to the ON state.

The drive OFF parameter SP is used for the determination of whether the movable unit 30a moved under a predetermined condition. In the second embodiment, as the predetermined condition, when a number of times when the movement quantity of the movable unit 30a during a predetermined time length is greater than or equal to a reference movement quantity, is greater than or equal to a reference number of times, the drive OFF parameter SP is set to 1 and the movement control of the movable unit 30a is set to the OFF state. However, the predetermined condition is not limited to this condition.

Figure 8:
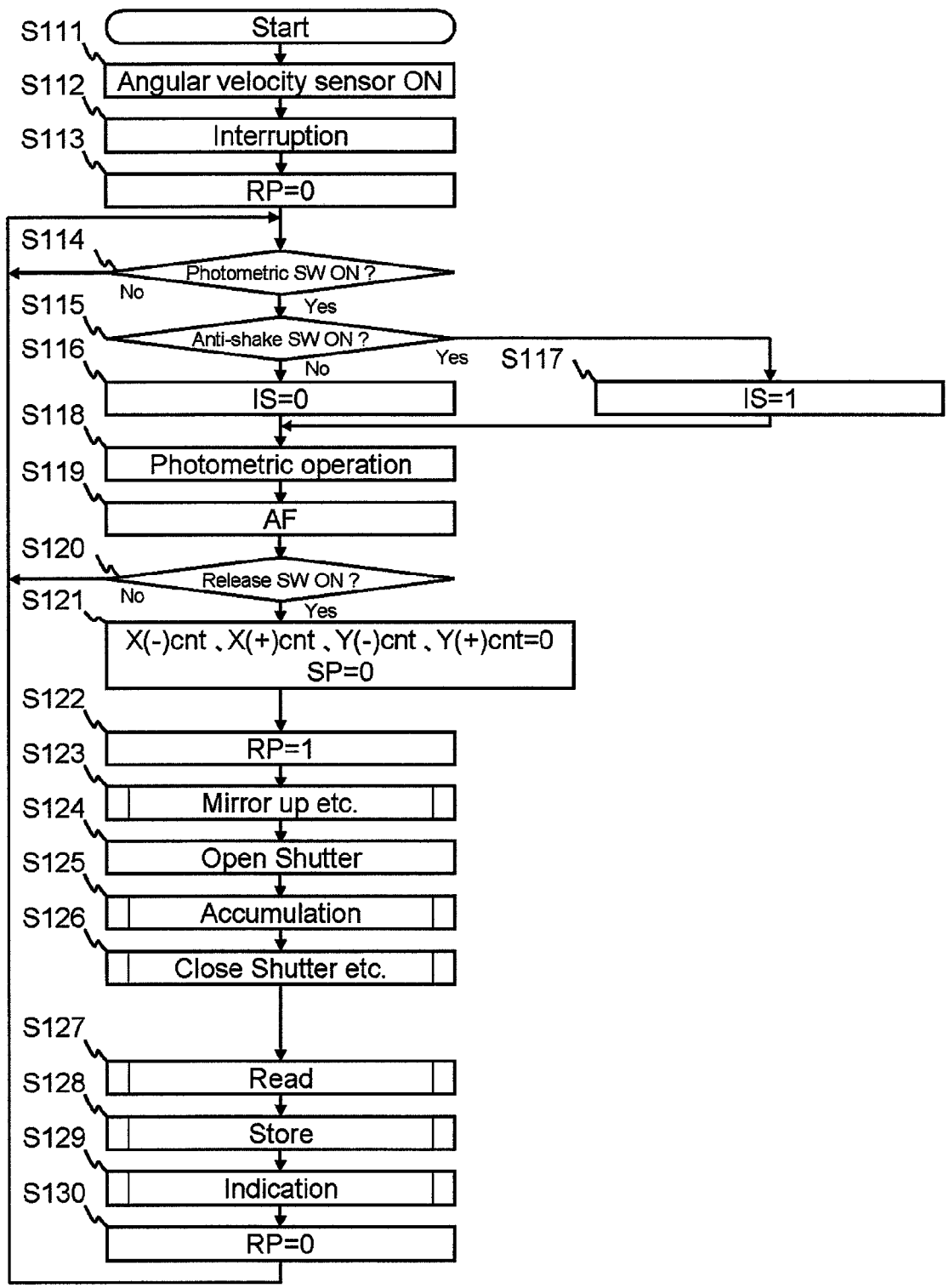
FIG. 8 is a flowchart that shows the main operation of the photographing apparatus in the second embodiment.

The value of the drive OFF parameter SP is set to 1 (see steps S182, S184, S186, and S188 in FIG. 10), when the release sequence operation is being performed after the release switch 13a is set to the ON state (when the value of the release state parameter RP is set to 1, see steps S122 to S130 in FIG. 8), and when either of the first positive direction counter X(+)cnt, the first negative direction counter X(−)cnt, the second positive direction counter Y(+)cnt, and the second negative direction counter Y(−)cnt is/are greater than or equal to the reference number of times STN. In this case, the CPU 21 sets the movement (driving) control of the movable unit 30a to the OFF state, even if the photographing apparatus 1 is in the exposure time (see step S153 in FIG. 9).

In the case that the value of the drive OFF parameter SP is set to 1, the hand-shake quantity is too large to move the movable unit 30a corresponding to the large amount of hand-shake and perform the anti-shake operation correctly (in an oscillation state), which means that the photographing apparatus 1 is in a state where the movable unit 30a has come into contact with the both ends of its range of movement.

Such a state can occur, for example; when the photographing apparatus 1 is installed on a tripod and when a vibration caused by the pushing operation of the release button 13 produces resonance in the tripod, or when an oscillation larger than normal hand-shake such as waving the photographing apparatus 1, occurs, etc.

In this case, the movable unit 30a oscillates in a manner such that the imaging operation is performed under the condition where the photographing operation corresponding to the operator's intentions cannot be performed, in other words, the movement control of the movable unit 30a for the anti-shake operation cannot be performed correctly, which means that the anti-shake operation cannot be performed correctly. Further, in the case where the impact between the movable unit 30a and the contacting part is large, the contacting part may break.

In the second embodiment, when the value of the drive OFF parameter SP is set to 1, the movement control of the movable unit 30a is set to the OFF state so that unnecessary movement of the movable unit 30a is limited. By limiting the unnecessary movement of the movable unit 30a, the consumption of electrical power of the photographing apparatus 1 can be reduced.

The value of the drive OFF parameter SP is not set to 1 (continuously set to 0) when the release sequence operation is being performed, after the release switch 13a is set to the ON state (when the value of the release state parameter RP is set to 1, see steps S122 to S130 in FIG. 8), and when all of the first positive direction counter X(+)cnt, the first negative direction counter X(−)cnt, the second positive direction counter Y(+)cnt, and the second negative direction counter Y(−)cnt are not greater than or equal to the reference number of times STN. In this case, the CPU 21 sets the movement (driving) control of the movable unit 30a to the ON state.

Next, the main operation of the photographing apparatus 1 in the second embodiment is explained by using the flowchart in FIG. 8.

When the photographing apparatus 1 is set to the ON state, the electrical power is supplied to the angular velocity detection unit 25 so that the angular velocity detection unit 25 is set to the ON state in step S111.

In step S112, the interruption process of the timer at the predetermined time interval (1 ms) commences. In step S113, the value of the release state parameter RP is set to 0. The detail of the interruption process of the timer in the second embodiment is explained later by using the flowchart in FIG. 9.

In step S114, it is determined whether the photometric switch 12a is set to the ON state. When it is determined that the photometric switch 12a is not set to the ON state, the operation returns to step S114 and the process in step S114 is repeated. Otherwise, the operation continues on to step S115.

In step S115, it is determined whether the anti-shake switch 14a is set to the ON state. When it is determined that the anti-shake switch 14a is not set to the ON state, the value of the anti-shake parameter IS is set to 0 in step S116. Otherwise, the value of the anti-shake parameter IS is set to 1 in step S117.

In step S118, the AE sensor of the AE unit 23 is driven, the photometric operation is performed, and the aperture value and exposure time are calculated.

In step S119, the AF sensor and the lens control circuit of the AF unit 24 are driven to perform the AF sensing and focus operations, respectively.

In step S120, it is determined whether the release switch 13a is set to the ON state. When the release switch 13a is not set to the ON state, the operation returns to step S114 and the process in steps S114 to S119 is repeated. Otherwise, the operation continues on to step S121 and then the release sequence operation commences.

In step S121, the values of the first positive direction counter X(+)cnt, the first negative direction counter X(−)cnt, the second positive direction counter Y(+)cnt, the second negative direction counter Y(−)cnt, and the drive OFF parameter SP are set to 0.

In step S122, the value of the release state parameter RP is set to 1.

In step S123, the mirror-up operation and the aperture closing operation corresponding to the aperture value that is either preset or calculated, are performed by the mirror-aperture-shutter unit 18.

After the mirror-up operation is finished, the opening operation of the shutter (the movement of the front curtain in the shutter) commences in step S124.

In step S125, the exposure operation, or in other words the electric charge accumulation of the imaging device (CCD etc.), is performed. After the exposure time has elapsed, in step S126, the closing operation of the shutter (the movement of the rear curtain in the shutter), the mirror-down operation, and the opening operation of the aperture are performed by the mirror-aperture-shutter unit 18.

In step S127, the electric charge which has accumulated in the imaging device during the exposure time is read. In step S128, the CPU 21 communicates with the DSP 19 so that the image processing operation is performed based on the electric charge read from the imaging device. The image, on which the image processing operation is performed, is stored to the memory in the photographing apparatus 1. In step S129, the image that is stored in the memory is displayed on the indicating unit 17. In step S130, the value of the release state parameter RP is set to 0 so that the release sequence operation is finished, and the operation then returns to step S114, in other words the photographing apparatus 1 is set to a state where the next imaging operation can be performed.

Figure 9:
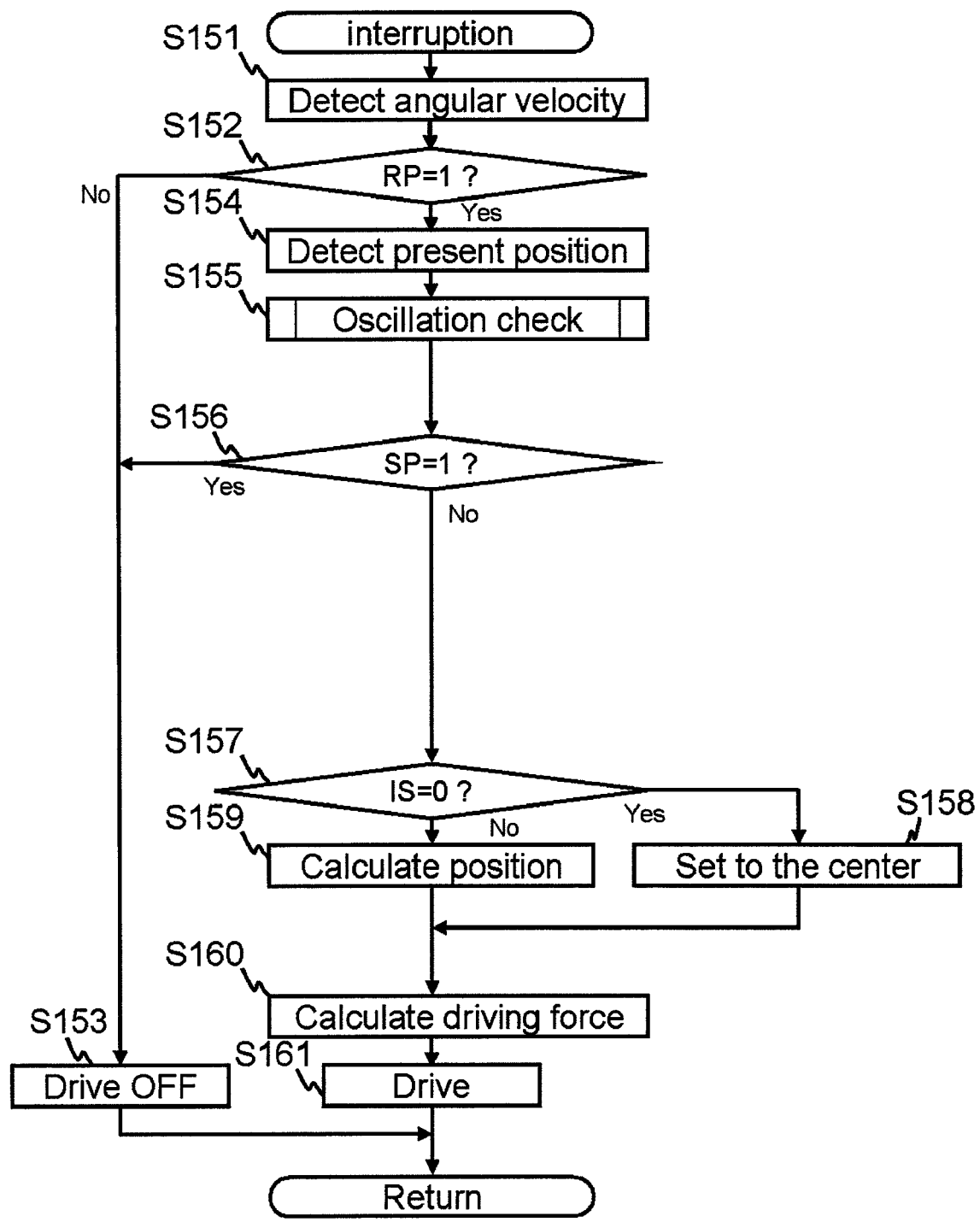
FIG. 9 is a flowchart that shows the detail of the interruption process of the timer in the second embodiment.

Next, the interruption process of the timer in the second embodiment, which commences in step S112 in FIG. 8 and is performed at every predetermined time interval (1 ms) independent of the other operations, is explained by using the flowchart in FIG. 9.

When the interruption process of the timer commences, the first angular velocity vx, which is output from the angular velocity detection unit 25, is input to the A/D converter A/D 0 of the CPU 21 and converted to the first digital angular velocity signal $Vx_n$, in step S151. The second angular velocity vy, which is also output from the angular velocity detection unit 25, is input to the A/D converter A/D 1 of the CPU 21 and converted to the second digital angular velocity signal $Vy_n$ (the angular velocity detection operation).

The low frequencies of the first and second digital angular velocity signals $Vx_n$ and $Vy_n$ are reduced in the digital high-pass filter processing operation (the first and second digital angular velocities $VVx_n$ and $VVy_n$).

In step S152, it is determined whether the value of the release state parameter RP is set to 1. When it is determined that the value of the release state parameter RP is not set to 1, driving the movable unit 30a is set to OFF state, or the anti-shake unit 30 is set to a state where the driving control of the movable unit 30a is not performed in step S153. Otherwise, the operation proceeds directly to step S154.

In step S154, the hall element unit 44a detects the position of the movable unit 30a, and the first and second detected-position signals px and py are calculated by the hall-element signal-processing unit 45. The first detected-position signal px is then input to the A/D converter A/D 2 of the CPU 21 and converted to a digital signal $pdx_n$, whereas the second detected-position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S155, it is determined whether the movable unit 30a is in the oscillation state; in other words, an oscillation check operation is performed. The detail of the oscillation check operation in the second embodiment is explained later by using the flowchart in FIG. 10.

In step S156, it is determined whether the value of the drive OFF parameter SP is set to 1. When it is determined that the value of the drive OFF parameter SP is set to 1, the driving of the movable unit 30a is set to the OFF state, or the anti-shake unit 30 is set to a state where the driving control of the movable unit 30a is not performed in step S153. Otherwise, the operation continues to step S157.

In step S157, it is determined whether the value of the anti-shake parameter IS is 0. When it is determined that the value of the anti-shake parameter IS is 0 (IS=0), in other words when the photographing apparatus is not in anti-shake mode, the position $S_n$ ($Sx_n$, $Sy_n$) where the movable unit 30a (the imaging unit 39a) should be moved is set at the center of the range of movement of the movable unit 30a, in step S158. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S159.

In step S160, the first driving force $Dx_n$ (the first PWM duty dx) and the second driving force $Dy_n$ (the second PWM duty dy) of the driving force D, which moves the movable unit 30a to the position $S_n$, are calculated on the basis of the position $S_n$ ($Sx_n$, $Sy_n$) that was determined in step S158 or step S159, and the present position $P_n$ ($pdx_n$, $pdy_n$).

In step S161, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $Sy_n$).

The process of steps S160 and S161 is an automatic control calculation that is used with the PID automatic control for performing general (normal) proportional, integral, and differential calculations.

Next, the oscillation check operation in the second embodiment which commences in step S155 in FIG. 9 is explained by using the flowchart in FIG. 10.

When the oscillation check operation commences, it is determined whether the value of the first coordinate of the present detected-position $P_n$ in the first direction x after the A/D conversion operation, $pdx_n$, is greater than the value of the first coordinate of the previous detected-position $P_{n-1}$ in the first direction x after the A/D conversion operation, $pdx_{n-1}$, in step S171.

When it is determined that the value of the first coordinate of the present detected-position $P_n$ in the first direction x after the A/D conversion operation, $pdx_n$, is greater than the value of the first coordinate of the previous detected-position $P_{n-1}$ in the first direction x after the A/D conversion operation, $pdx_{n-1}$, the operation proceeds directly to step S174, otherwise the operation continues to step S172.

In step S172, it is determined whether the absolute value of the difference between the value of the first coordinate of the present detected-position $P_n$ in the first direction x after the A/D conversion operation, $pdx_n$, and the value of the first coordinate of the previous detected-position $P_{n-1}$ in the first direction x after the A/D conversion operation, $pdx_{n-1}$; in other words, the first coordinate of the movement quantity of the movable unit 30a in the first direction x in the predetermined time interval of 1 ms ($|pdx_n-pdx_{n-1}|$), is greater than or equal to the reference movement quantity STW.

When it is determined that the first coordinate of the movement quantity of the movable unit 30a in the first direction x in the predetermined time interval of 1 ms ($|pdx_n-pdx_{n-1}|$) is greater than or equal to the reference movement quantity STW, the movement speed of the movable unit 30a in the first direction x and in the negative direction is greater than or equal to the predetermined speed, so the operation continues to step S173. Otherwise, the movement speed of the movable unit 30a in the first direction x and in the negative direction is not greater than or equal to the predetermined speed, in which case the operation proceeds directly to step S176.

In step S173, the value of the first negative direction counter X(−)cnt is increased by the value of 1, and then the operation proceeds to step S176.

In step S174, it is determined whether the absolute value of the difference between the value of the first coordinate of the present detected-position $P_n$ in the first direction x after the A/D conversion operation, $pdx_n$ and the value of the first coordinate of the previous detected-position $P_{n-1}$ in the first direction x after the A/D conversion operation, $pdx_{n-1}$; in other words, the first coordinate of the movement quantity of the movable unit 30a in the first direction x in the predetermined time interval of 1 ms ($|pdx_n-pdx_{n-1}|$), is greater than or equal to the reference movement quantity STW.

When it is determined that the first coordinate of the movement quantity of the movable unit 30a in the first direction x in the predetermined time interval of 1 ms ($|pdx_n-pdx_{n-1}|$) is greater than or equal to the reference movement quantity STW, the movement speed of the movable unit 30a in the first direction x and in the positive direction is greater than or equal to the predetermined speed, so the operation continues to step S175. Otherwise, the movement speed of the movable unit 30a in the first direction x and in the positive direction is not greater than or equal to the predetermined speed, in which case the operation proceeds directly to step S176.

In step S175, the value of the first positive direction counter X(+)cnt is increased by the value of 1, and then the operation proceeds to step S176.

It is determined whether the value of the second coordinate of the present detected-position $P_n$ in the second direction y after the A/D conversion operation, $pdy_n$, is greater than the value of the second coordinate of the previous detected-position $P_{n-1}$ in the second direction y after the A/D conversion operation, $pdy_{n-1}$, in step S176.

When it is determined that the value of the second coordinate of the present detected-position $P_n$ in the second direction y after the A/D conversion operation, $pdy_n$, is greater than the value of the second coordinate of the previous detected-position $P_{n-1}$ in the second direction y after the A/D conversion operation, $pdy_{n-1}$, the operation proceeds directly to step S179, otherwise the operation continues to step S177.

In step S177, it is determined whether the absolute value of the difference between the value of the second coordinate of the present detected-position $P_n$ in the second direction y after the A/D conversion operation, $pdy_n$, and the value of the second coordinate of the previous detected-position $P_{n-1}$ in the second direction y after the A/D conversion operation, $pdy_{n-1}$; in other words, the second coordinate of the movement quantity of the movable unit 30a in the second direction y in the predetermined time interval of 1 ms ($|pdy_n-pdy_{n-1}|$), is greater than or equal to the reference movement quantity STW.

When it is determined that the second coordinate of the movement quantity of the movable unit 30a in the second direction y in the predetermined time interval of 1 ms ($|pdy_n-pdy_{n-1}|$) is greater than or equal to the reference movement quantity STW, the movement speed of the movable unit 30a in the second direction y and in the negative direction is greater than or equal to the predetermined speed, so the operation continues to step S178. Otherwise, the movement speed of the movable unit 30a in the second direction y and in the negative direction is not greater than or equal to the predetermined speed, in which case the operation proceeds directly to step S181.

In step S178, the value of the second negative direction counter Y(−)cnt is increased by the value of 1, and then the operation proceeds to step S181.

In step S179, it is determined whether the absolute value of the difference between the value of the second coordinate of the present detected-position $P_n$ in the second direction y after the A/D conversion operation, $pdy_n$, and the value of the second coordinate of the previous detected-position $P_{n-1}$ in the second direction y after the A/D conversion operation, $pdy_{n-1}$; in other words, the second coordinate of the movement quantity of the movable unit 30a in the second direction y in the predetermined time interval of 1 ms ($|pdy_n-pdy_{n-1}|$), is greater than or equal to the reference movement quantity STW.

When it is determined that the second coordinate of the movement quantity of the movable unit 30a in the second direction y in the predetermined time interval of 1 ms ($|pdy_n-pdy_{n-1}|$) is greater than or equal to the reference movement quantity STW, the movement speed of the movable unit 30a in the second direction y and in the positive direction is greater than or equal to the predetermined speed, so the operation continues to step S180. Otherwise, the movement speed of the movable unit 30a in the second direction y and in the positive direction is not greater than or equal to the predetermined speed, in which case the operation proceeds directly to step S181.

In step S180, the value of the second positive direction counter Y(+)cnt is increased by the value of 1, and then the operation proceeds to step S181.

In step S181, it is determined whether the value of the first positive direction counter X(+)cnt is greater than or equal to the reference number of times STN. When it is determined that the value of the first positive direction counter X(+)cnt is greater than or equal to the reference number of times STN, it is judged that the movable unit 30a is in an oscillation state, so the operation continues to step S182. Otherwise, the operation proceeds directly to step S183. In step S182, the value of the drive OFF parameter SP is set to 1, and then the operation continues to step S183.

In step S183, it is determined whether the value of the first negative direction counter X(−)cnt is greater than or equal to the reference number of times STN. When it is determined that the value of the first negative direction counter X(−)cnt is greater than or equal to the reference number of times STN, it is judged that the movable unit 30a is in an oscillation state, so the operation continues to step S184. Otherwise, the operation proceeds directly to step S185. In step S184, the value of the drive OFF parameter SP is set to 1, and then the operation continues to step S185.

In step S185, it is determined whether the value of the second positive direction counter Y(+)cnt is greater than or equal to the reference number of times STN. When it is determined that the value of the second positive direction counter Y(+)cnt is greater than or equal to the reference number of times STN, it is judged that the movable unit 30a is in an oscillation state, so the operation continues to step S186. Otherwise, the operation proceeds directly to step S187. In step S186, the value of the drive OFF parameter SP is set to 1, and then the operation continues to step S187.

In step S187, it is determined whether the value of the second negative direction counter Y(−)cnt is greater than or equal to the reference number of times STN. When it is determined that the value of the second negative direction counter Y(−)cnt is greater than or equal to the reference number of times STN, it is judged that the movable unit 30a is in an oscillation state, so the operation continues to step S188. Otherwise, the oscillation check operation is finished. In step S188, the value of the drive OFF parameter SP is set to 1, and then the oscillation check operation is finished.

In the second embodiment, the movement control of the movable unit 30a is set to the OFF state when the hand-shake quantity is too large to move the movable unit 30a corresponding to the large amount of hand-shake and perform the anti-shake operation correctly (in an oscillation state), which means the photographing apparatus 1 is in a state where the movable unit 30a has come into contact with both ends of its range of movement.

Such a state can occur, for example; when the photographing apparatus 1 is installed on a tripod and when a vibration caused by the pushing operation of the release button 13 produces resonance in the tripod, or when an oscillation larger than normal hand-shake such as waving the photographing apparatus 1, occurs, etc.

In this case, the movable unit 30a oscillates so that the imaging operation is performed under the condition where the photographing operation corresponding to the operator's intentions cannot be performed, in other words, the movement control of the movable unit 30a for anti-shake operation cannot be performed correctly, which means that the anti-shake operation cannot be performed correctly.

Therefore, unnecessary movement of the movable unit 30a is limited, compared to when the movement of the movable unit 30a is not set to the OFF state in such the oscillation state. Further, by limiting the unnecessary movement of the movable unit 30a, the consumption of electrical power of the photographing apparatus 1 can be reduced. Further, the possibility of breakage of the contacting part etc. can be prevented.

Further, discomfort due to the shock caused by the impact between the movable unit 30a and the point of contact which stops its movement, that the operator of the photographing apparatus 1 feels, can also be reduced.

In the second embodiment, the determination of whether the hand-shake quantity is large or not (whether the movable unit 30a is in the oscillation state or not), so that the anti-shake operation can be performed correctly or not, is based on the position detection of the movable unit 30a (the determination of whether the number of times when the movement speed of the movable unit 30a is greater than the predetermined speed is greater than or equal to the reference number of times STN or not). However, this determination may be based on another function. For example, the determination of whether the anti-shake operation can be performed correctly or not may be based on the detection of quantity of change of the hand-shake quantity per time (the angular velocity) on the basis of the signals (vx, vy, $Vx_n$, and $Vy_n$) input to the CPU 21 from the first and second angular velocity sensors 26a and 26b. In this case, as the determination, it is determined whether the number of times when the quantity of change of the hand-shake quantity calculated by the anti-shake operation is greater than the reference quantity, is greater than or equal to the reference number of times.

In the first and second embodiments, the anti-shake operation is performed only when the release sequence operation, after setting the ON state of the release switch 13a, and when the value of the drive OFF parameter SP is set to 0.

However, the anti-shake operation may be performed in a time period except for the release sequence operation. In this case (anti-shake operation in a time period except for the release sequence operation), when the value of the drive OFF parameter SP is set to 1, the driving of the movable unit 30a is set to the OFF state so that the anti-shake operation commences again after a predetermined time period has elapsed (after the movable unit 30a has reached a stable state).

Further, it is explained that the movable unit 30a has the imaging device; however, the movable unit 30a may have a hand-shake correcting lens instead of the imaging device.

Further, it is explained that the hall element is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall element.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2006-192616 (filed on Jul. 13, 2006) and 2006-192719 (filed on Jul. 13, 2006), which are expressly incorporated herein by reference, in their entirety.

The invention claimed is:

1. An anti-shake apparatus of a photographing apparatus, comprising:
a movable unit; and
a controller that performs movement control of said movable unit for anti-shake operation;
said movement control being set to an OFF state when said movable unit comes into contact with an end of its range of movement under a predetermined condition.

2. The anti-shake apparatus according to claim 1, wherein said predetermined condition is that said movable unit comes into contact with both ends of said range of movement in a first direction which is one of the directions of movement of said movable unit, or in a second direction which is another of the directions of movement of said movable unit.

3. The anti-shake apparatus according to claim 2, further comprising a position detection unit that is used for said anti-shake operation;
wherein a detection of whether said movable unit has come into contact with said end of said range of movement is based on a position detection for said movable unit by said position detection unit.

4. The anti-shake apparatus according to claim 1, wherein said predetermined condition is that a hand-shake quantity that is calculated in said anti-shake operation is greater than an upper limited value of a predetermined range or less than a lower limited value of said predetermined range.

5. The anti-shake apparatus according to claim 1, wherein said controller performs said movement control for said anti-shake operation, from a point when a release switch of said photographing apparatus is set to an ON state to a point when said photographing apparatus is set to a state where the next imaging operation can be performed.

6. An anti-shake apparatus of a photographing apparatus, comprising:
a movable unit;
a position detector that detects a position of said movable unit; and
a controller that performs movement control of said movable unit for anti-shake operation at predetermined time periods,
wherein the position detector detects the position of the movable unit when the movable unit is moved by the controller for the anti-shake operation,
wherein said movement control is set to an OFF state when a number of times that a quantity of a movement of said movable unit is greater than or equal to a reference quantity is greater than or equal to a reference number of times, and
wherein the controller determines whether the quantity of the movement of said movable unit is greater than or equal to the reference movement quantity, based on the position of said movable unit detected by said position detection unit.

7. The anti-shake apparatus according to claim 6, wherein the movement control is further set to an OFF state when a number of times that a quantity of change in a hand-shake quantity calculated by the anti-shake operation is greater than a reference quantity, is greater than or equal to a reference number of times.

8. The anti-shake apparatus according to claim 6, wherein said controller performs said movement control for said anti-shake operation, from a point when a release switch of said photographing apparatus is set to an ON state to a point when said photographing apparatus is set to a state in which a next imaging operation can be performed.

9. The anti-shake apparatus according to claim 6, wherein said position detector comprises a hall element and a hall-element signal-processing unit that outputs a coordinate of the position of the movable unit based on an output signal of the hall element.

10. The anti-shake apparatus according to claim 6, further comprising a driver circuit that moves the movable unit according to the movement control by the controller,
wherein, when the movement control set to the OFF state, the driver circuit stops moving the movable unit.

11. The anti-shake apparatus according to claim 6, wherein the OFF state is a state in which movement control is not performed.

12. The anti-shake apparatus according to claim 6, wherein the reference quantity and the reference number of times define a condition in which the anti-shake operation is ineffective.

* * * * *